(12) United States Patent
de Vaal et al.

(10) Patent No.: US 12,490,795 B2
(45) Date of Patent: Dec. 9, 2025

(54) APPAREL PATCH

(71) Applicant: Amer Sports Canada Inc., North Vancouver (CA)

(72) Inventors: Jacobus Bernardus de Vaal, West Vancouver (CA); Thomas W. C. Fayle, North Vancouver (CA); Dana Spittal, Vancouver (CA); Russell James Beardsley, Brackendale (CA)

(73) Assignee: Amer Sports Canada Inc., North Vancouver (CA)

( * ) Notice: Subject to any disclaimer, the term of this patent is extended or adjusted under 35 U.S.C. 154(b) by 219 days.

(21) Appl. No.: 18/396,078

(22) Filed: Dec. 26, 2023

(65) Prior Publication Data

US 2025/0204628 A1 Jun. 26, 2025

(51) Int. Cl.
*A41H 27/00* (2006.01)

(52) U.S. Cl.
CPC .................... *A41H 27/00* (2013.01)

(58) Field of Classification Search
CPC .................................................. A41H 27/00
See application file for complete search history.

(56) References Cited

U.S. PATENT DOCUMENTS

| | | | | | |
|---|---|---|---|---|---|
| 2,116,008 A | * | 5/1938 | Block | .................... | A41H 27/00 152/367 |
| 2,304,852 A | * | 12/1942 | Sharples | ................. | B29C 73/00 38/17 |
| 3,138,505 A | * | 6/1964 | Hirsch | ................... | A41H 27/00 156/289 |
| 3,271,217 A | * | 9/1966 | Mapson | ................. | B29C 73/00 156/303.1 |
| 3,513,048 A | * | 5/1970 | Snyder | .................... | B29C 73/00 428/138 |
| 4,036,674 A | * | 7/1977 | Labenz | .................... | B29C 73/00 30/310 |
| 4,047,994 A | * | 9/1977 | Komatsu | ................. | B29C 73/00 427/140 |
| 4,358,335 A | * | 11/1982 | Reinert | ................... | A41H 27/00 156/379 |
| 4,406,723 A | * | 9/1983 | Marra | .................... | A41H 27/00 156/227 |
| 2018/0317666 A1 | * | 11/2018 | Clarke | ...................... | C09J 7/385 |
| 2019/0055742 A1 | * | 2/2019 | Brower | ............... | E04G 23/0214 |

FOREIGN PATENT DOCUMENTS

DE 2401506 A1 * 7/1975 ............. A41H 27/00

OTHER PUBLICATIONS

Machine translation DE2401506A1 (Year: 1975).*

* cited by examiner

*Primary Examiner* — Abbas Rashid
*Assistant Examiner* — Ayne K. Swier
(74) *Attorney, Agent, or Firm* — Terence P. O'Brien; Todd A. Rathe

(57) ABSTRACT

An apparel may include a panel having an apparel panel with an aperture extending through the panel from an interior face to an exterior face of the apparel panel. A patch extends opposite the apparel panel and across the aperture on the interior face of the apparel panel. The patch may include a layer joined to portions of the apparel panel about the aperture and filling the aperture so as to be flush with the exterior face of the apparel panel.

14 Claims, 11 Drawing Sheets

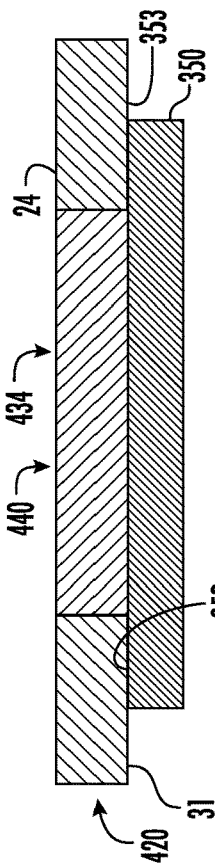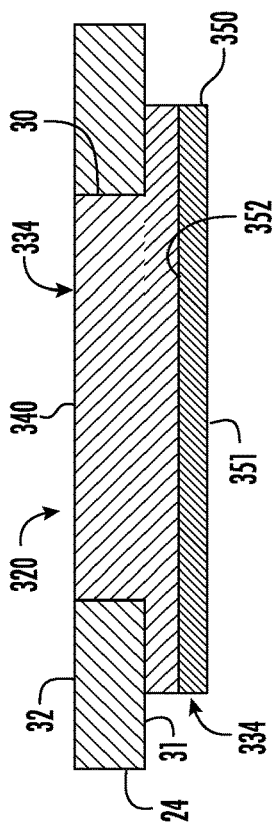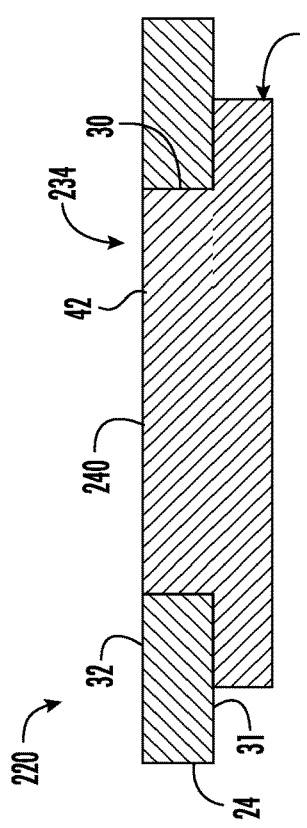
FIG. 3  FIG. 5  FIG. 7
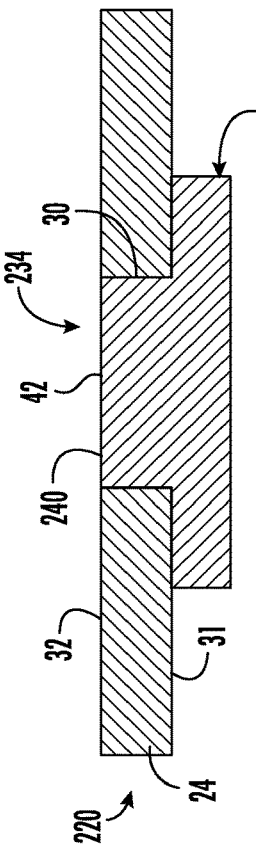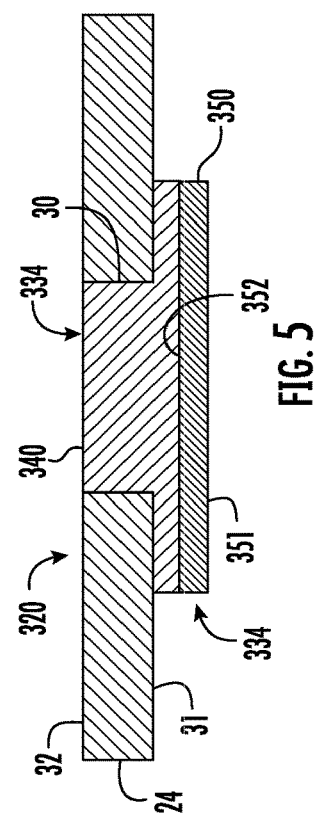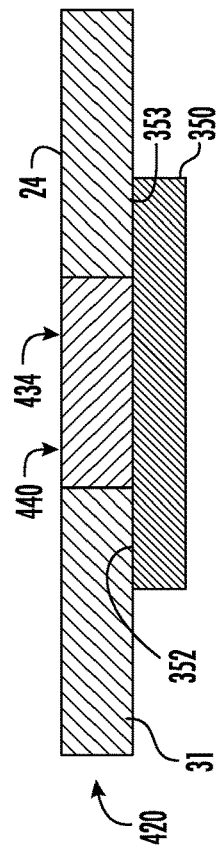
FIG. 4  FIG. 6  FIG. 8

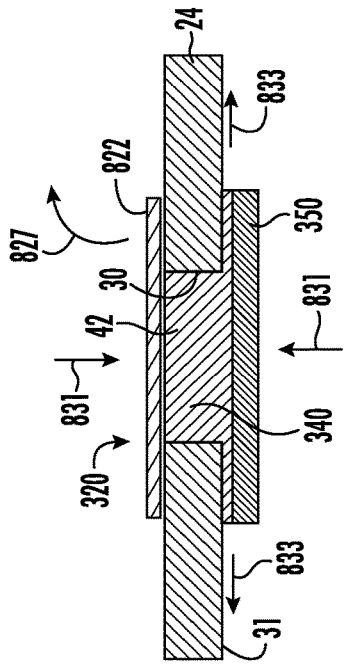
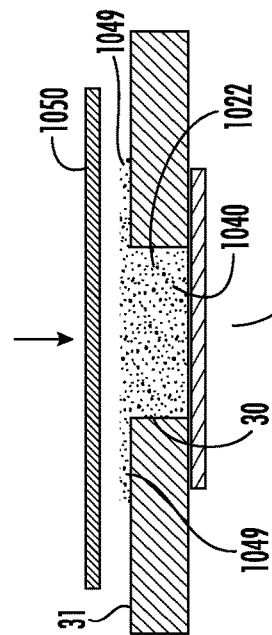
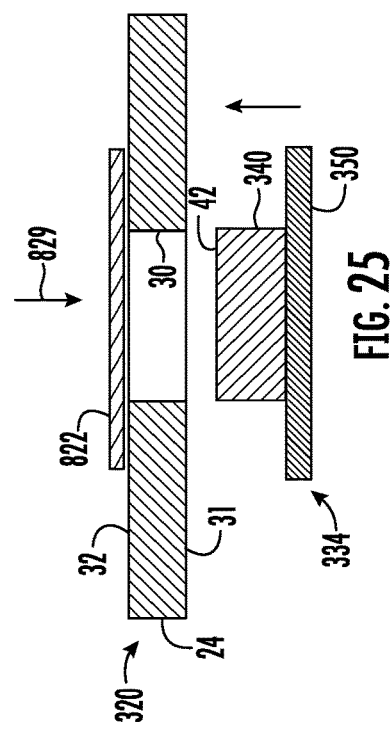
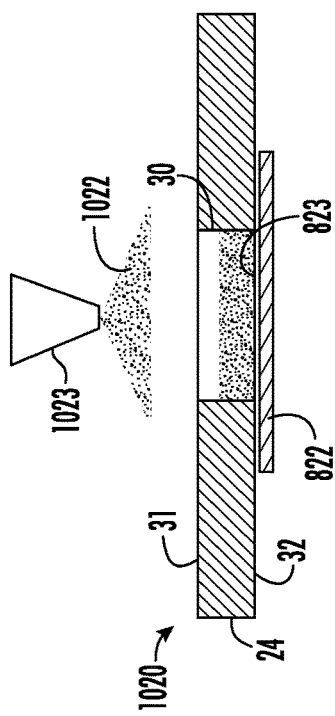
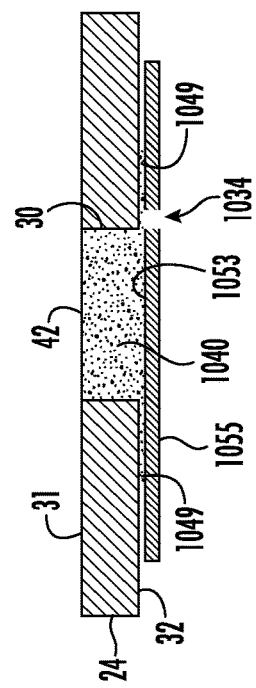

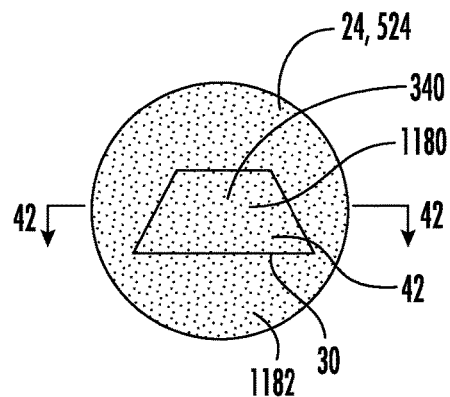 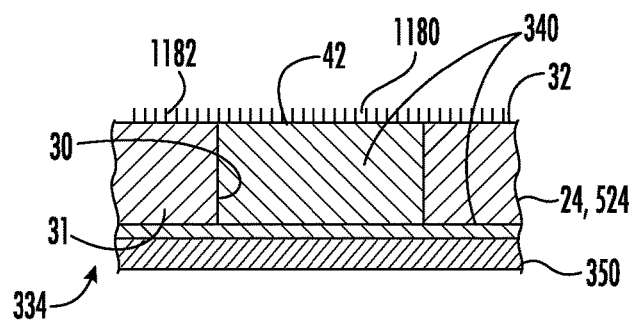
FIG. 41  FIG. 42
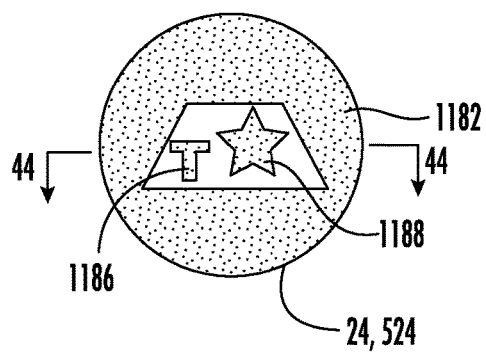 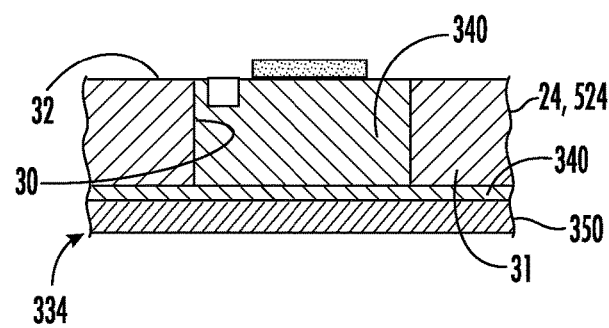
FIG. 43  FIG. 44

APPAREL PATCH

BACKGROUND

Apparel is often designed to withstand the elements, such as wind and rain. Some outdoor apparel is specifically designed to be waterproof while also being breathable. For example, many pieces of apparel are formed from expanded polytetrafluoroethylene (ePTFE), such as GORE-TEX® fabric. Current methods for repairing damaged apparel, especially outdoor apparel formed from ePTFE, may be cost prohibitive and may yield less than desirable results.

BRIEF DESCRIPTION OF THE DRAWINGS

FIG. 3 is a sectional view of a portion of an example patched apparel taken along line 3-3 of FIG. 1.

FIG. 4 is a sectional view of a portion of an example patched apparel taken along line 4-4 of FIG. 1.

FIG. 5 is a sectional view of a portion of an example patched apparel taken along line 3-3 of FIG. 1.

FIG. 6 is a sectional view of a portion of an example patched apparel taken along line 4-4 of FIG. 1.

FIG. 7 is a sectional view of a portion of an example patched apparel taken along line 3-3 of FIG. 1.

FIG. 8 is a sectional view of a portion of an example patched apparel taken along line 4-4 of FIG. 1.

FIGS. 25 and 26 are sectional views of portions of an example apparel panel, patch, and embossing panel to illustrate an example apparel patching and embossing method.

FIGS. 28, 29 and 30 are sectional views of portions of an example apparel panel, embossing panel and fluid patcher to illustrate an example apparel patching and embossing method.

FIG. 41 is an enlarged top view of a portion of an example patched and embossed apparel panel.

FIG. 42 is a sectional view of the example patched and embossed apparel panel of FIG. 41 taken along line 42-42.

FIG. 43 is an enlarged top view of a portion of example patched and embossed apparel panel.

FIG. 44 is a sectional view of the example patched and embossed apparel panel of FIG. 43 taken along line 44-44.

Figure 2:
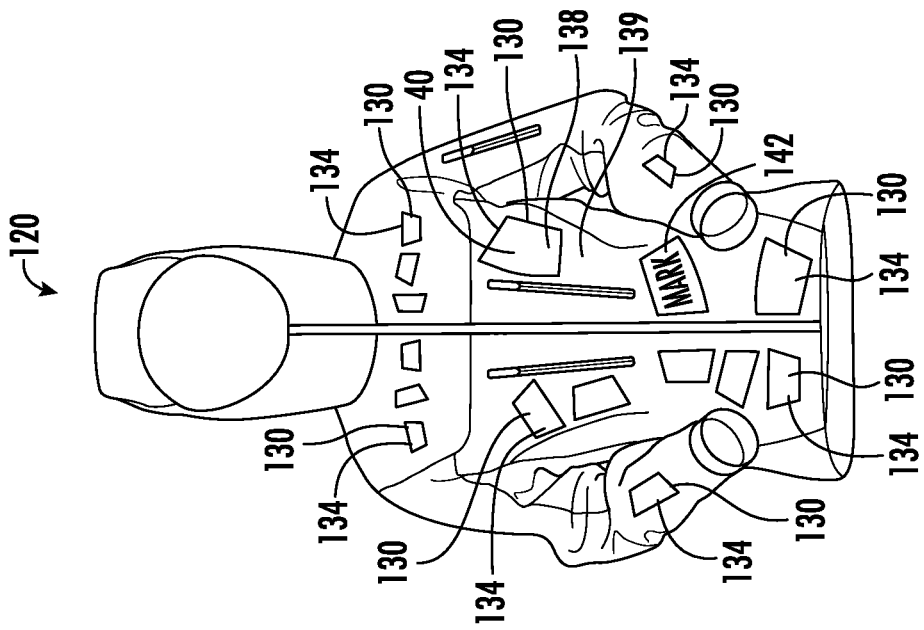
FIG. 2 is a front perspective view of an example patched apparel.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example apparel and example apparel repair or modification methods. The apparel may comprise any garment or piece of clothing that is subject to damage such as cuts, tears, stains, burns or the like. The example apparel patching methods remove damaged portions of the apparel and replace the damaged portions in a manner such that the repaired portion of the apparel may be less conspicuous with respect to appearance and/or touch.

The example patching methods facilitate the repair of a damaged apparel in a fast and cost-effective manner. The example patching methods may be utilized to repair larger sized damaged regions or spots, regions greater than an area of 4 mm$^2$ (or greater than 0.125 inch in diameter). The example patching methods facilitate repairing of a portion of the panel, rather than complete replacement of an entire panel. Rather than the damaged apparel being thrown away, the resulting repaired apparel may continue to be used, reducing waste and conserving resources.

In some implementations, the disclosed methods may be used to modify an apparel to provide a customized feature or appearance. For example, a selected portion of the apparel may be removed and replaced with a replacement portion having any color, insignia, texture, graphic, design or the like. In such implementations, the selected portion may have a customized shape. Such methods may offer an aftermarket customization or apparel labeling.

Disclosed are example apparel (also referred to as garments, clothing the like) that include a panel having an aperture extending through the panel from an interior face to an exterior face of the panel. In such implementations, a patch extends opposite the panel and across the aperture on an interior face of the panel. The patch comprises a layer joined to portions of panel about the aperture and filling the aperture such that at least portions of the exterior face of the patch are flush with the exterior face of the panel. In some implementations, the layer may be in the form of one or more adhesives.

In some implementations, the patch consists of a single layer of material, wherein portions of the layer project into the aperture to fill the aperture. In some implementations, those portions of the layer were previously in a fluid state such that the material of the layer flowed into the aperture to fill the aperture prior to being set. In some implementations, those portions of the layer within the aperture are fused to the interior sides of the aperture. In some implementations, other portions of the layer are additionally fused to the interior face of the panel about the aperture. In some implementations, those portions of the layer within the aperture were previously in a fluid state so as to impregnate openings or fibers of the panel along the interior sides of the aperture and/or along the interior face of the panel.

In some implementations, the layer comprises a layer of a thermoplastic material which may be placed in a fluid state in response to application of a sufficient amount of, such as a temperature above the melting point of the material. In such implementations, the material may be set (changed to a non-flowable state or a solid-state) by cooling. In some implementations, the layer comprises a layer of a thermoset material which may be in a fluid state, but which may be set due to a lapse of time or due to the application of a stimulus, such as a chemical catalyst, heat, cooling, or an electromagnetic catalyst (ultraviolet light or the like).

In some implementations, the layer of material may comprise material that is the forming material or materials at expands when exposed to air or subjected to a stimulus. For example, in some implementations, the layer material may expand into the aperture or may expand to more fully fill the aperture. In some implementations, the amount of material or the stimulus applied to the material of the layer may be controlled such that the final expansion of the material results in the layer being flush with the exterior face of the panel. In some implementations, a cap or cover may be positioned over the aperture and on top of the exterior face of the panel to limit or control expansion of the material such that the material of the layer, when set and no longer expanding, is flush with the exterior face of the panel. In some implementations, such expansion of the material the layer may be controlled (or uncontrolled) such that the layer, when set, rises above for projects above the exterior face of the panel so as to be more conspicuous and noticeable.

In some implementations, the layer is water resistant, resisting the passage of water droplets therethrough. In some implementations, the layer is water resistant, yet breathable, resisting the passage of water droplets, yet permitting the passage of water vapor. In some implementations, the layer has a color or texture matching that of the exterior face of the panel. In some implementations, the layer may be embossed to provide an exterior face inside of the patch with a texture that matches the texture of the exterior face of the panel or with a customized texture distinct from that of the panel. In some implementations, the layer may be embossed to provide a customized label, insignia or other markings. In some implementations, a layer may have a color that is chosen to match or nearly match that of the exterior face of the panel. In some implementations, the layer may have a color distinct from that of the exterior face of the panel. In some implementations, the layer may be translucent or clear.

In some implementations, the patch may additionally comprise a backing or substrate supporting the layer. The backing may comprise one or more layers of at least one material different than that of the layer. In some implementations, the backing may be of the same composition as that of the panel. In some implementations, the backing may have an interior face and an exterior face, wherein the layer extends over the exterior face. In such implementations, the layer may be transparent or translucent while the exterior face of the backing has a color matching or nearly matching the color of the exterior face of the panel. In some implementations, layer may be transparent or translucent, the exterior face of the backing may have a color matching or nearly matching the color of the exterior face of the panel and the interior face of backing may have a color matching or nearly matching the color of the interior face of the panel. In some implementations, the layer may be transparent or translucent, the exterior face of the backing having a color distinct from that of the exterior face of the panel, and the interior face of the backing may have color matching or nearly matching the color of the interior face of the panel.

In some implementations, the patch applied over and across the aperture comprises a structural patch panel including the layer (and in some implementations, a backing), wherein the structural patch panel is positioned over and across the aperture. In some implementations, the layer is pressed so as to be deformed or bent into the aperture so as to be adjacent or flush with the exterior face of the apparel panel. In such implementations, the thickness of the structural patch panel is not substantially changed with respect to those portions extending across the aperture and those portions overlying the apparel panel. In such implementations, the layer may form a concavity on the interior face of the apparel panel opposite the aperture. In some implementations, the structural patch panel is pressed while the layer is in a fluid or malleable/softened state so as to flow or be molded (change shape with certain portions having a change in thickness as compared to being simply being bent) into and fill the aperture prior to being set.

In some implementations the patch is formed within the aperture, wherein internal sides of the aperture serve as a physical mold for the patch. For example, in some implementations, a material may be sprayed, poured or injected into the aperture so as to fill the aperture. In some implementations, the material may be sprayed, poured or injected into the aperture so as to fill the aperture such that the material, when set, forms a layer within the aperture and having a surface that is flush with the exterior face of the panel. In some implementations, the material may be sprayed, poured or injected into the aperture, when the material subsequently expands (such as a foaming material). For example, as described above, the material may expand such the layer is flush with the exterior face of the apparel panel or its expansion may be limited by a cover or cap so as to be flush with the exterior face of the apparel panel. As described above, in some implementations, the expansion of the material may result in the layer of material, when set, projecting above or rising above the exterior face of the apparel panel.

In some implementations, the layer residing within the aperture and filling the aperture may be embossed. In some implementations, the embossment may result in those portions of the layer adjacent to the exterior face of the apparel panel having the same or nearly the same texture as that of the exterior face of the apparel panel. In some implementations, the embossment may result in those portions of the layer having a customized texture distinct from that of the exterior face of the apparel panel. In some implementations, the embossment may result in those portions of the layer having a customized and added logo, insignia, label, or other marking. For example, the embossment may result in those portions of the layer adjacent to the exterior face of the apparel panel having the name of the apparel owner, the name of an organization (i.e., company, club, sports team), a design or logo and the like.

Such embossing may be carried out while exterior portions of the layer (whether as part of a structural patch panel or formed from an injected or sprayed material) are in a flowable or moldable/embossable state, prior to being set (cooling of a thermoplastic material forming layer or curing of a thermoset material forming the layer). For purposes of this disclosure, an "embossable" state means that a layer or surface is sufficiently malleable, melted or softened so as to deform about and against surface irregularities (texture, detents protuberances) of an embossing structure (plate, panel, fabric, iron or the like) in contact with the layer surface such that the surface has a shape mirroring at least portions of the surface irregularities of the embossing structure. In some circumstances, the surface or layer maintain its embossed shape mirroring that of the embossing structure only while the layer material is in contact with the embossing structure, wherein the layer or surface is set to maintain its embossment prior to withdrawal of the embossing structure. In some circumstances, the surface or layer is softened, but sufficiently viscous (between a liquid and a solid-state) so as to maintain the embossment without being set but after withdrawal of the embossing structure, wherein the surface or layer may be subsequently set following withdrawal of the embossing structure.

Such embossing may be carried out by positioning an embossing panel over those portions of the layer filling the aperture. The embossing panel may be a layer of fabric having a texture matching or substantially matching appearance and/or feel. The embossing panel can mimic the density of the yarn weave or the texture of the exterior face of the apparel panel. As noted above, in some implementations, the embossing panel may have a texture different than that of the exterior face of the apparel panel or may have a shape or configurations so as to emboss text or a design. The embossing panel may be similar to a branding iron positioned against those portions of the layer filling the aperture. In some implementations, the embossing panel may apply a coating, paint or coloring during the embossing. In some implementations where the layer is a thermoplastic material, the embossing panel may be heated to a temperature above the melting temperature of the material of the layer filling the aperture. In some implementations, where the layer is a thermoset material that cures or crossings in response to the application of heat, the embossing panel may be heated to a temperature so as to concurrently embossed and set the layer.

Once the targeted texture or other external surface shape has been molded or defined, the material of the layer may be set, wherein such setting may occur while the embossing panel is in contact with material of the layer, whereupon following such setting, the embossing panel is removed or separated from the layer. As described above, the setting may occur in response to cooling (as in the case of a thermoplastic material layer) or a lapse of time or the application of a stimulus (as in the case of a thermoset material layer).

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two or more fluid transmitting volumes are connected directly to one another or are connected to one another by intermediate volumes or spaces such that fluid may flow from one volume into the other volume.

For purposes of this disclosure, the phrase "configured to" denotes an actual state of configuration that fundamentally ties the stated function/use to the physical characteristics of the feature proceeding the phrase "configured to".

For purposes of this disclosure, the term "releasably" or "removably" with respect to an attachment or coupling of two structures means that the two structures may be repeatedly connected and disconnected to and from one another without material damage to either of the two structures or their functioning.

Figure 1:
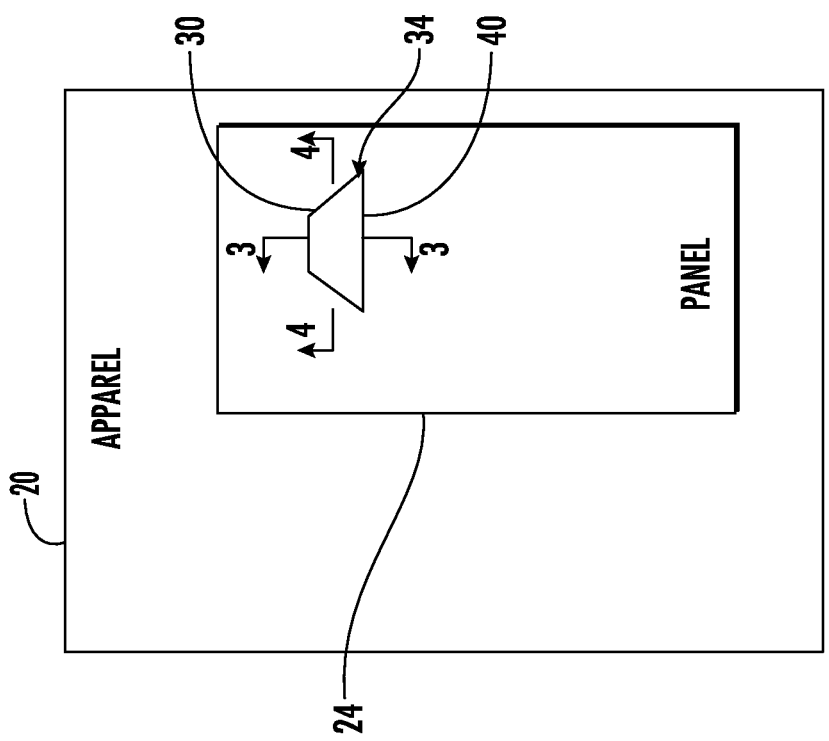
FIG. 1 is a diagram schematically illustrating an example patched apparel.

FIG. 1 is a diagram schematically illustrating portions of an example apparel 20 that has been repaired or modified. Apparel 20 may comprise a panel 24 (schematically illustrated) which may be joined to other panels to form the apparel 20. Panel 24 comprises an aperture 30 extending completely through the one or more layers forming panel 24. Aperture 30 extends from an interior face of panel 24 to an exterior face of panel 24, the aperture 30 opening along each of such faces. For purposes of this disclosure, the term "exterior face" is a face that is configured to face outwardly away from the body of the person wearing the apparel, whereas the term "interior face" refers to a face that is configured to face inwardly towards the body of the person wearing the apparel. Although aperture 30 is illustrated as having a trapezoid shape, aperture 30 may have a variety of other shapes and sizes.

Apparel 20 further comprises a patch 34 having a layer 40 which fills aperture 30, extending from the interior face to the exterior face. In some implementations, the layer 40 has an exterior face that is flush with (level with) those portions of the exterior face of panel 24 adjacent aperture 30. In some implementations, layer 40 may project above those portions of the exterior face of panel 24 adjacent to aperture 30. As will be described hereafter, in some implementations patch 34 may consist of a single self-supporting layer 40. As will be described hereafter, in some implementations, patch 34 may comprise a substrate or backing supporting or extending over layer 40. As will be described hereafter, in some implementations, patch 34 may be a structural panel that is joined to panel 24 prior to filling aperture 30. As will be described hereafter, in some implementations, patch 34 may comprise a layer of material (with or without a backing or substrate) that is formed upon the backing/substrate or within aperture 34 by being sprayed or injected into the aperture 34. As will be described hereafter, in some implementations, the exterior face or surface of layer 40 may be molded/embossed. The exterior face or surface of layer 40 may be embossed so as to have a texture matching or substantially matching the texture of adjacent portions of panel 24 about aperture 30. The exterior surface of layer 40 may be embossed so as to have a name, logo, design, insignia or other shape defined by grooves/depressions extending into the surface of layer 40 and/or protuberances or projections extending from or above the surface of layer 40.

In some implementations, layer 40 is formed from a thermoplastic material. In some implementations, layer 40 is formed from a thermoset material. In some implementations, layer 40 may be a material that has expanded, such as a foam material. In some implementations, layer 40 has the same or substantially the same color as that of the exterior surface of panel 24. In some implementations, layer 40 is clear/transparent or translucent such that the color seen through layer 40 is that of a backing supporting layer 40 (when provided) or that of the person or another apparel or garment covered by apparel 20. In some implementations, layer 40 is water resistant. In some implementations, layer 40 is water resistant and breathable. In some implementations, panel 24 is formed from a breathable and water-resistant material such as an expanded polytetrafluoroethylene material (sometimes referred to as GORE-TEX® fabric or material). In such implementations or in some implementations, layer 40 may be formed from a thermoplastic adhesive such as thermoplastic adhesives commercially available from Bemis Associates.

FIG. 2 is a front perspective view illustrating repaired or modified apparel 120, one example of apparel 20. Apparel 120 is shown as a hooded jacket or coat having a front zipper and a hood. As should be appreciated, apparel 20 may have various other forms and configurations. As further shown by FIG. 2, apparel 120 comprises multiple example patches 134 showing or extending across multiple apertures 130. Such apertures 130 and patches 134 are provided on the front torso portion of apparel 120, on the upper chest portion of apparel 120 and/or on the long sleeves of apparel 120. Apertures 130 and past 134 have a variety of different sizes, shapes and orientations on apparel 120. Some of patches comprise a texture 138 that substantially matches the corresponding texture 139 of surrounding portions of apparel 120. Some of patches comprise a "mark" 141, wherein the mark may form a raised or depressed text, graphic, insignia, design or another embossed configuration on the exterior surface of the layer 40 of the respective patch 134.

FIGS. 3 and 4 are sectional views of an example repaired or modified (patched) apparel 220 taken along lines 3-3 and 4-4, respectively, of FIG. 1. As shown by FIGS. 3 and 4, aperture 30 extends from an interior face 31 to an exterior face 32 of apparel panel 24. Patch 234 consists of a single layer 240 of material filling aperture 30. Layer 240 may have any of the characteristics and/or compositions described above with respect to layer 40. In the example illustrated, the single layer 240 of material extends along the exterior face 32 of panel 24 and projects into and through aperture 30, terminating at an exterior face 42 that is flush or level with the exterior face 32 of panel 24.

FIGS. 5 and 6 are sectional views of an example repaired or modified (patched) apparel 320 taken along lines 3-3 and 4-4, respectively, of FIG. 1. Apparel 320 is similar to apparel 220 described above except that apparel 320 comprises a patch 334 formed from a layer 340 and a backing 350. Layer 340 may have all the characteristics and compositions described above with respect to layer 40. Backing 350 supports or covers portions of layer 340 on the panel 24. In some implementations, backing 350 is formed from one or more panels corresponding to the one or more panels forming panel 24. For example, in some implementations, backing 350 may comprise a water resistant and breathable material. In some implementations, backing 350 may comprise an expanded polytetrafluoroethylene material, fabric or membrane (one example of which is a commercially available GORE-TEX TM fabric or material). In some implementations, backing 350 has an interior face 351 having a color and/or texture corresponding to the color and/or texture of interior face 31 of panel 24. In some implementations, backing 350 has an exterior face 352 having a color corresponding to the color of exterior face 32 of panel 24, wherein layer 340 is translucent or transparent. In some implementations, backing 350 has an exterior face 351 having a color distinct from that of exterior 32.

As shown by FIGS. 5 and 6, layer 340 not only fills aperture 30, but extends between backing 350 and portions of the interior face 31 of panel 24. In such implementations, portion of layer 340 may serve as an adhesive bonding backing 350 to interior face 31 of panel 24. In some implementations, layer 340 may be pressed into and deformed or reshaped to fill aperture 30. In some implementations, layer 340 may have an inverted T-shape, with an upper portion having a shape and size corresponding to the shape and size of aperture 30.

FIGS. 7 and 8 are sectional views of an example repaired or modified (patched) apparel 420 taken along lines 3-3 and 4-4, respectively, of FIG. 1. Apparel 420 is similar to apparel 320 described above except that apparel 420 comprise a patch 434 in lieu of patch 334. Patch 434 is similar to patch 334 described above except that patch 434 comprises a layer 440 which is not coextensive with backing 350. Those remaining characteristics and compositions of layer 440 may be similar to the characteristics and compositions of layer 40 described above. In the example illustrated, layer 440 is supported by backing 350 and has a shape and a size substantially corresponding to the shape and the size of aperture 30. In such implementations, the exterior face 352 of backing 350, not underlying layer 440 may be provided with an adhesive coating 353 further bonding backing 350 to the interior face 31 of panel 24. In some implementations, adhesive coating 353 is the same material as layer 440.

Figure 9:
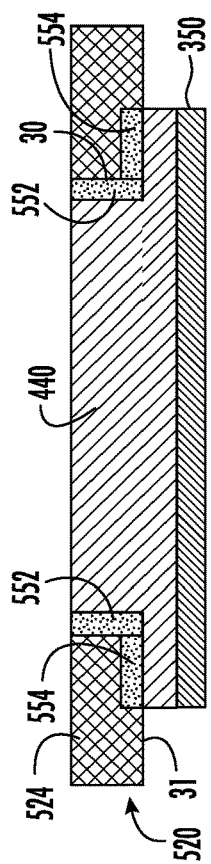
FIG. 9 is a sectional view of a portion of an example patched apparel taken along line 3-3 of FIG. 1.
Figure 10:
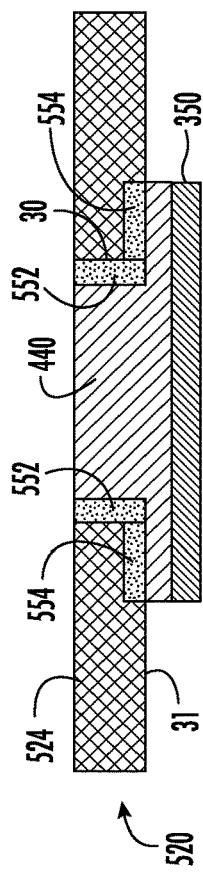
FIG. 10 is a sectional view of a portion of an example patched apparel taken along line 4-4 of FIG. 1.

FIGS. 9 and 10 are sectional views of an example apparel 520 taken along lines 3-3 and 4-4 of FIG. 1, respectively. Apparel 520 is similar to Apparel 320 described above except that apparel 520 comprises apparel panel 524 through which aperture 30 extends. Apparel panel 524 comprises a mesh, matrix or fabric about opening 30 and having interstitial voids between the fibers of the mesh, matrix or fabric. Layer 340 at least partially fills the interstitial voids to impregnate portions of panel 524 along opening 30 and along interior face 31 to form impregnated portions 552 along the interior sides of aperture 30 and impregnated portions 554 along interior face 31 about aperture 30. As will be described hereafter, in some implementations, at least portions of layer 340 may be in a fluid state within aperture 30 and during impregnation of panel 524. Thereafter, such portions of layer 340 may be set or cured as described above.

Figure 11:
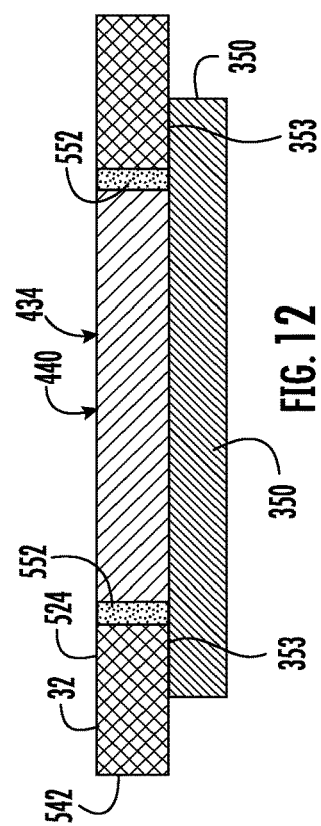
FIG. 11 is a sectional view of a portion of an example patched apparel taken along line 3-3 of FIG. 1.
Figure 12:
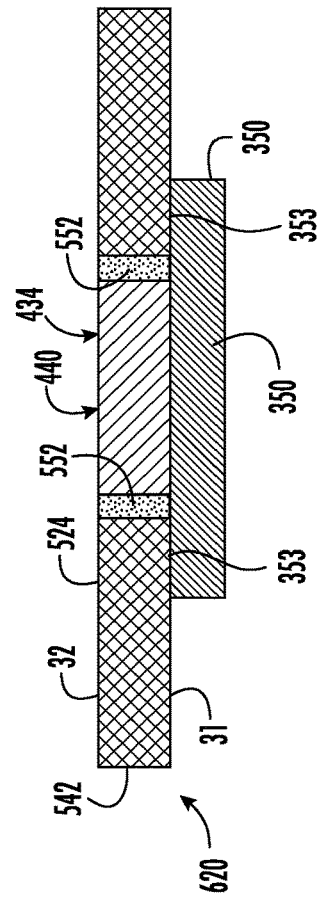
FIG. 12 is a sectional view of a portion of an example patched apparel taken along line 4-4 of FIG. 1.

FIGS. 11 and 12 are sectional views of an example apparel 620 taken along lines 3-3 and 4-4 of FIG. 1, respectively. Apparel 620 is similar to apparel 420 described above except that apparel 620 comprises apparel panel 524 through which aperture 30 extends. Apparel panel 524 comprises a mesh, matrix or fabric about opening 30 and having interstitial voids between the fibers of the mesh, matrix or fabric. Layer 440 at least partially fills the interstitial voids to impregnate portions of panel 524 along opening 30 to form impregnated portions 552 along the interior sides of aperture 30. As will be described hereafter, in some implementations, at least portions of layer 440 may be in a fluid state within aperture 30 and during impregnation of panel 524. Thereafter, such portions of layer 440 may be set as described above. In some implementations, adhesive coating 353 is the same material as layer 440. In other implementations, adhesive coating 353 can be formed of another adhesive material.

Figure 13:
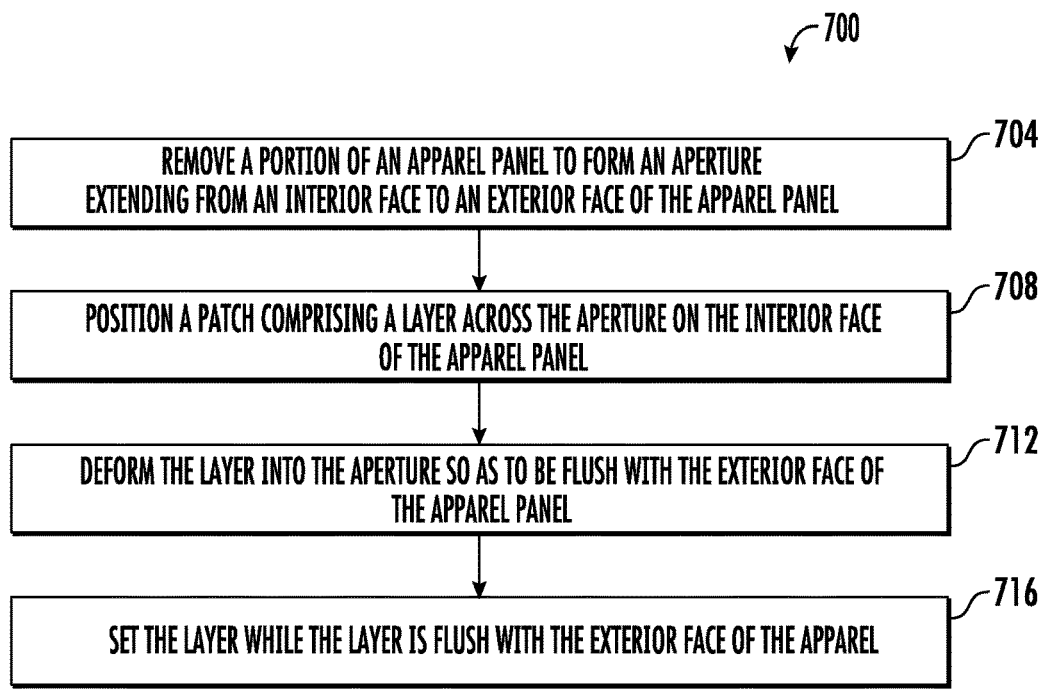
FIG. 13 is a flow diagram of an example apparel patching method.

FIG. 13 is a flow diagram of an example apparel modification or repair (patching) method 700. Method 700 may be utilized to form any of the apparel shown and described above with respect to FIGS. 1-12. As indicated by block 704, a portion of an apparel panel, such as apparel panel 24, is removed to form an aperture, such as aperture 30, extending from an interior face to an exterior face of the apparel panel. In some implementations, the aperture is completely bounded on all sides by uncut or unsevered portions of the apparel panel. In some implementations, the portion of the apparel panel is removed using a cutting die which is in the form of a cutting blade which concurrently cuts an entire shape or periphery of the aperture being formed. In some implementations, the portion of the apparel panel may be removed using other material removal techniques such as laser cutting, other cutting techniques, chemical ablation or the like. In some implementations, the portion of the apparel panel that is removed comprises a damaged portion of the apparel such as a portion that is been cut, severed, perforated or burned. In some implementations, the portion apparel than on that is removed is not damaged or otherwise distinguishable from remaining portion of the apparel panel but lies at a location where a patch within insignia, design, logo, name or other label or mark is desired.

As indicated by block 708, a patch, such as patch 34, patch 234, patch 334, or patch 434, is positioned across the aperture on the interior face of the apparel panel. The patch may comprise a layer, such as layer 40, layer 240, layer 340, or layer 440 which extends across the aperture on the interior face of the apparel panel.

As indicated by block 712, the layer is deformed into the aperture so as to be flush with the exterior face of the apparel panel. Such deformation may comprise compressing the layer into the aperture. Such deformation may comprise pressing the layer into the aperture while the layer is in a malleable/softened state or in a fluid state. For example, the layer may be a thermoplastic layer, wherein the layer is at an elevated temperature above the melting point of the thermoplastic material forming the thermoplastic layer. The layer may be a thermoset material that is temporarily in a fluid or malleable/softened state.

As indicated by block 716, the layer is set while at least portions of the layer are flush with the exterior face of the panel. For purposes of this disclosure, a layer is "set" or "cured" when the layer is currently no longer flowable/fluid or embossable (see definition above). In the case of the layer being a thermoplastic material, the layer may be set after being allowed to cool or after being rapidly cooled to a temperature below its melting point. In the case of the layer being a thermoset material, the layer may be set after a sufficient amount of time and/or the application of a stimulus (heat, light, the like) to facilitate curing or cross-linking of the material. As described above, in some implementations, the material layer may be set while impregnating portions of the apparel panel along the aperture.

Figure 14:
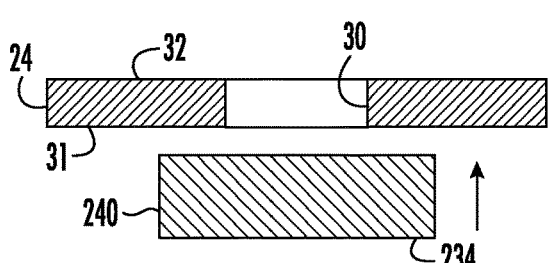
FIGS. 14, 15 and 16 are sectional views of portions of an example apparel panel and patch to illustrate an example patching method.
Figure 15:
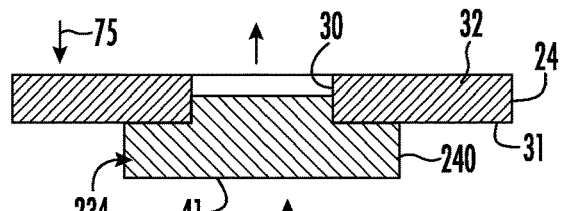
Figure 16:
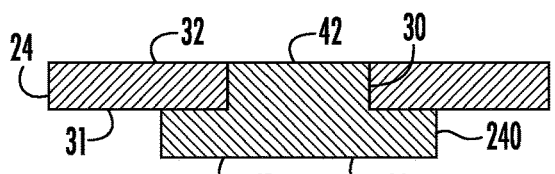

FIGS. 14-16 are sectional views illustrating an example of the repair or modification (patching) of an apparel. FIGS. 14-16 illustrate the repair or modification of an apparel to form apparel 220 described above with respect to FIGS. 3 and 4. As shown by FIG. 14, a portion of apparel panel 24 is removed to form aperture 30. Patch 234, comprising layer 240, is positioned across the aperture 30 on the interior face 31 of panel 24.

As shown by FIG. 15, the layer 240 is deformed into aperture 30. As indicated by arrows 75, such deformation may be facilitated by compressing patch 234 and panel 24 between a pair of compression plates. In some implementations, deformation of layer 240 into aperture 30 may additionally occur while layer 240 is in a malleable/softened or fluid state. In implementations where layer 240 comprises a thermoplastic material, layer 240 may be at a temperature greater than the melting point of the thermoplastic material. In some implementations, layer 240 may additionally be expandable, such as with a forming material, or layer 240 additionally expands into opening 30.

Figure 17:
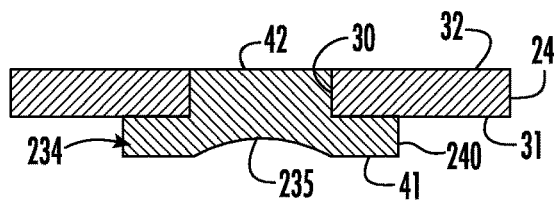
FIG. 17 is a sectional view illustrating portions of an example patched apparel panel.

As shown by FIG. 16, layer 240 is deformed until at least portions of the exterior face 42 of layer 240 are substantially flush with the exterior face 32 of panel 24. In some implementations, the deformation is controlled by covering the mouth of aperture 30 on the exterior 32 of panel 24, wherein the covering limits deformation of layer 240 past the surface of exterior face 32. In the example shown in FIG. 16, patch 234 comprises a single layer 240 and the final deformed interior face 41 of layer 240 remains parallel to the interior face 31 of panel 24. In other words, the thickness of layer 240 remains uniform on either side of aperture 30 and across aperture 30. As shown in FIG. 17, in some implementations, portions of layer 240 opposite to aperture 30 may form a concavity or depression 235 extending into internal interface 41 opposite to aperture 30 where portions of layer 240 have been displaced into aperture 30.

Figure 18:
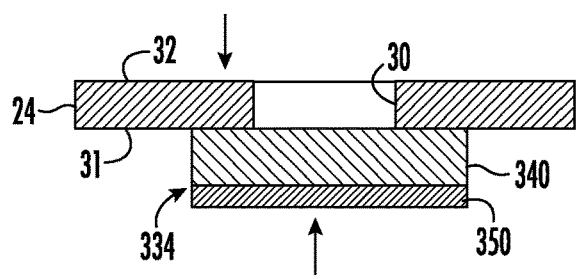
FIGS. 18 and 19 are sectional views of a portion of example apparel panel and patch to illustrate an example patching method.
Figure 19:
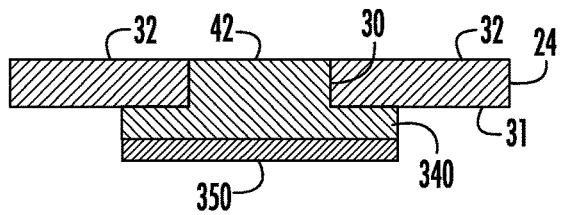

FIGS. 18 and 19 are sectional views illustrating the repair or modification (patching) of an apparel to form apparel 320 described above with respect to FIGS. 5 and 6. As shown by FIG. 18, the portion of panel 24 is removed to form aperture 30. A patch 334 is positioned across the aperture 30 on the interior face 31 of panel 24. As described above, patch 334 comprises a substrate or backing 350 and supporting layer 340.

As shown by FIG. 19, layer 340 is deformed until the exterior face 42 of layer 340 is substantially flush with the exterior face 32 of panel 24. In some implementations, the deformation is controlled by covering the mouth of aperture 30 on the exterior 32 of panel 24, wherein the covering limits deformation of layer 240 past the surface of exterior face 32. In some implementations the "covering" may comprise one of two plates being used to compress the patch. In the example shown in FIG. 16, patch 334 comprises a layer 340 and backing 350. The thickness of layer 340 can vary so that the thickness of layer 340 beneath the panel is very thin.

Figure 20:
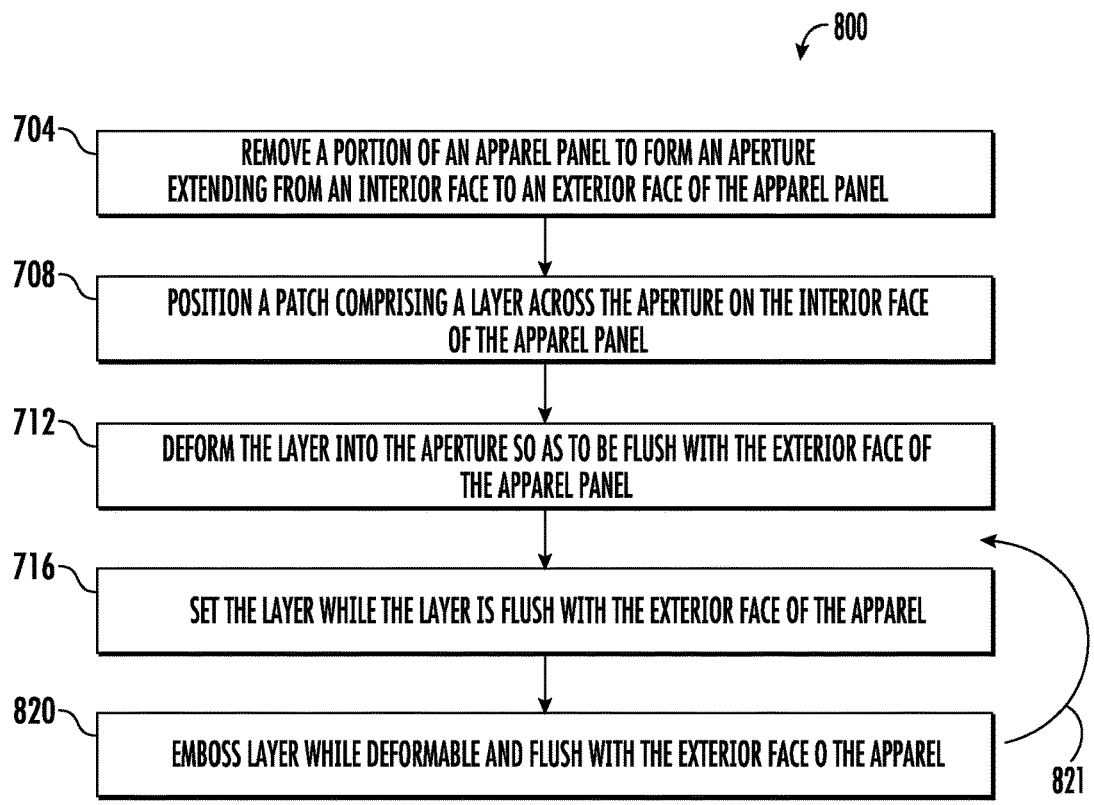
FIG. 20 is a flow diagram of an example apparel patching and embossing method.

As discussed above, in some implementations the exterior face 42 of the layer filling aperture 30 may additionally be embossed. FIG. 20 is a flow diagram of an example apparel patching method 800 that may be performed to form any of the apparel shown in FIG. 1-12 with the additional embossment on surface 42. Method 800 is similar to method 700 described above except that method 800 additionally comprises block 820. Those remaining blocks of method 800 which correspond to blocks of method 700 are numbered similarly.

As indicated by block 820, the layer, such as layer 40, 340, or 440, is embossed while the layer is embossable. Such embossment may result in those portions of the layer adjacent to the exterior face of the apparel panel having the same or nearly the same texture as that of the exterior face of the apparel panel. In some implementations, the embossment may result in those portions of the layer having a customized texture distinct from that of the exterior face of the apparel panel. In some implementations, the embossment may result in those portions of the layer having a customized and added logo, insignia, label, or other marking. For example, the embossment may result in those portions of the layer adjacent to the exterior face of the apparel panel having the name of the apparel owner, the name of an organization (i.e., company, club, sports team), a design or logo and the like.

As indicated by arrow 821, such embossing may be carried out while exterior portions of the layer (whether as part of a structural patch panel or formed from an injected or sprayed material) are in a fluid or moldable/embossable state, prior to being set (cooling of a thermoplastic material forming layer or curing of a thermoset material forming the layer). Such embossing may be carried out by positioning an embossing panel over those portions of the layer filling the aperture. The embossing panel may be a layer of fabric having a texture matching or substantially matching the texture of the exterior face of the apparel panel. As noted above, in some implementations, the embossing panel may have a texture different than that of the exterior face of the apparel panel or may have a shape or configurations so as to emboss a text or design. The embossing panel may be similar to a branding iron positioned against those portions of the layer filling the aperture. In some implementations, the embossing panel may apply a coating, painter coloring during the embossing. In some implementations where the layer is a thermoplastic material, the embossing panel may be heated to a temperature above the melting temperature of the material of the layer filling the aperture.

Once the targeted texture or other external surface shape has been molded or defined, the material of the layer may be set, wherein such setting may occur while the embossing panel is in contact with the surface of the layer, whereupon following such setting, the embossing panel is removed or separated from the layer. As described above, the setting may occur in response to cooling the layer (as in the case of a thermoplastic material layer) or in response to a lapse of time or the application of a stimulus (as in the case of a thermoset material layer).

Figure 21:
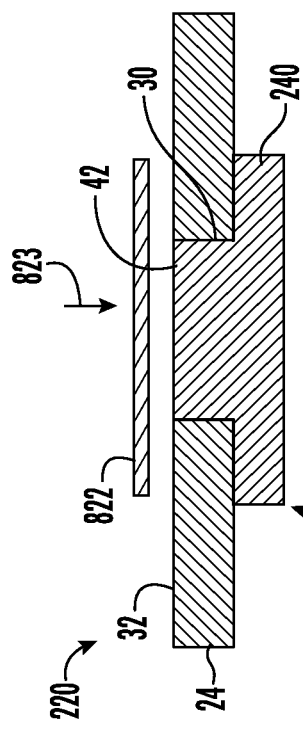
FIG. 21 is a sectional view of an example apparel panel, patch, and embossing panel illustrating an example apparel patching and embossing method.

FIG. 21 is a sectional view illustrating an example embossment of apparel 220 described above. FIG. 21 illustrates an embossing panel 822 being moved in the direction indicated by arrow 823 into engagement with the exterior face 42 of layer 240 while the exterior face 42 is in a malleable/embossable state. Embossing panel 822 may comprise a metal or other rigid plate having a surface texture or a surface embossing pattern (logo, text, design of the like) which may be pressed into the embossable surface 42. In some implementations, embossing panel 822 may comprise a fabric or other material having a texture corresponding to the texture of exterior face 32 of panel 24. The fabric or other material may be pressed into or against surface 42 while surface 42 is in its embossable state.

In some implementations, surface 42 and/or embossing panel 822 may be heated to a temperature above the melting point of the material of surface 42 to facilitate such embossing. In some implementations, surface 42 may be an uncured or non-cross-linked thermoset material prior to and during embossing by embossing panel 822. In some implementations, while the embossing panel 822 is in contact or being pressed against surface 42, the material of surface 42 may be set as discussed above, this may involve the cooling of the material or may involve curing or cross-linking of the material. Thereafter, the embossing panel he 22 may be removed or separated from the exterior face 42, leaving the exterior face 42 of layer 40 with a texture substantially matching the texture of exterior 32 of panel 24. In some implementations, layer 40 is in the embossable state as it is being pressed so as to fill aperture 30 and until face 42 has been embossed by embossing panel 822. In some implementations, layer 40 may first be set within aperture 40 and then reheated (in the case of a thermoplastic material) for subsequent embossment and being set a second time.

Figure 22:
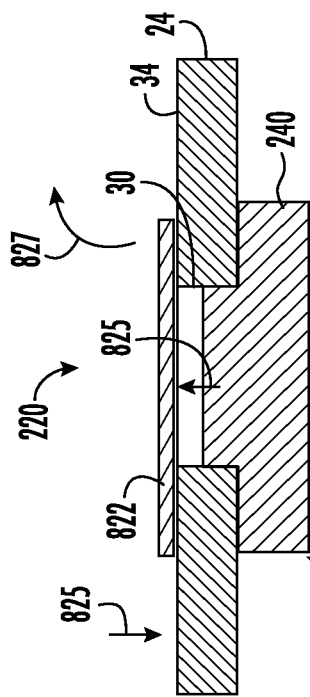
FIG. 22 is a sectional view of portions of an example apparel panel, patch, and embossing panel illustrating an example apparel patching and embossing method.

FIG. 22 is a sectional illustrating an example embossment of apparel 220 described above. The method shown in FIG. 22 is similar to the method shown in FIG. 21 except that the embossing panel 822 is positioned over and across aperture 30 prior to layer 240 of patch 234 completely filling aperture 30 and reaching exterior face 32 of panel 24. Embossing panel 822 may be held or pressed against the top of panel 24 while spanning aperture 30. As indicated by arrows 825, layer 240 is deformed into aperture 30 until filling aperture 30 and until contacting the embossing surface of embossing panel 822. This is done while layer 240 is in the embossable state. Thereafter, as described above with respect to FIG. 21, the material of layer 240 may be set and the embossing panel 822 may be separated as indicated by arrow 827. In some implementations, embossing panel 822 may be separated from layer 240 prior to complete setting of surface 42, wherein face 42 is sufficiently set to maintain its embossed state even upon separation of embossing panel 822. In other implementations, the placing of embossing panel 822 over the panel as shown by arrow 823 and the moving of layer 240 into the aperture 30 as indicated by arrow 825 could occur at the same time or at substantially the same time.

Figure 23:
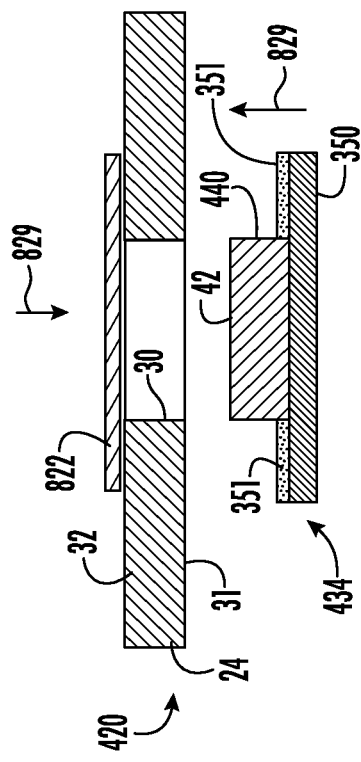
FIGS. 23 and 24 are sectional views of portions of an example apparel panel, patch, and embossing panel to illustrate an example apparel patching and embossing method.
Figure 24:
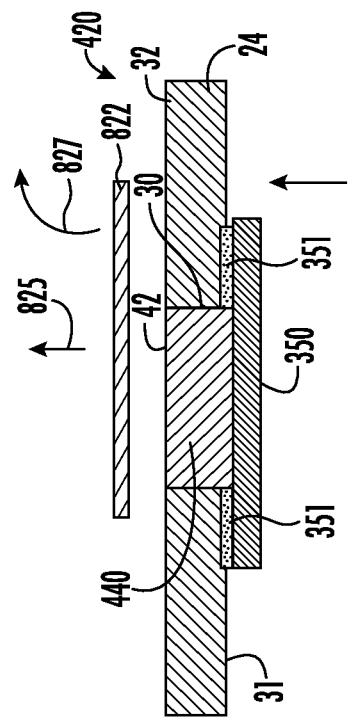

FIGS. 23 and 24 are sectional views illustrating an example embossing of apparel 420 shown in FIGS. 7 and 8. As shown in FIG. 23 embossing panel 822 is positioned over and across aperture 30 on the exterior face 32 of panel 24. Patch 434 is positioned over and across aperture 30 on the interior face 31 of panel 24. In the example illustrated, layer 440 is aligned with aperture 30. As indicated by arrows 829, layer 440 is raised and inserted into aperture 30 with backing 350 carrying an adhesive 351 that is brought into contact with portions of interior face 31 about aperture 30 (shown in FIG. 24). Embossing panel 822 embosses and engages interface 42 of layer 440 while layer 440 is in an embossable state (a state at which the layer may be molded and shaped). Upon setting of face 42 of layer 440, the embossing panel 822 may be removed as indicated by arrow 827.

FIGS. 25 and 26 are sectional views illustrating the embossing of apparel 320 (or apparel 520 when panel 524 used in place of panel 24). As shown by FIG. 25, embossing panel 822 is positioned over and across aperture 30 on the exterior face 32 of panel 24. Patch 334 is positioned on the interior face of panel 24 with layer 340, supported by backing 350, aligned with aperture 30. As shown by FIG. 26, layer 340 is moved into aperture 30 and as indicated by arrows 831, is compressed by opposing compression plates while layer 340 is in a fluid or embossable state. Such compression results in surface 42 of layer 340 being imprinted upon or embossed with the texture or raise/depressed pattern on the lower face of embossing panel 822. As indicated by arrows 833, such compression may result in portions of layer 340 being squeezed outward and between backing 350 and interior face 31 of panel 24. The compressed and somewhat fluid state of layer 340 may result in portions of layer 340 serving to bond or join layer 340 to the interior sides of aperture 30 as well as portions of interior face 31 of panel 24. Thereafter, the material of layer 340 may be set and embossing panel 822 may be removed as indicated by arrow 827.

Figure 27:
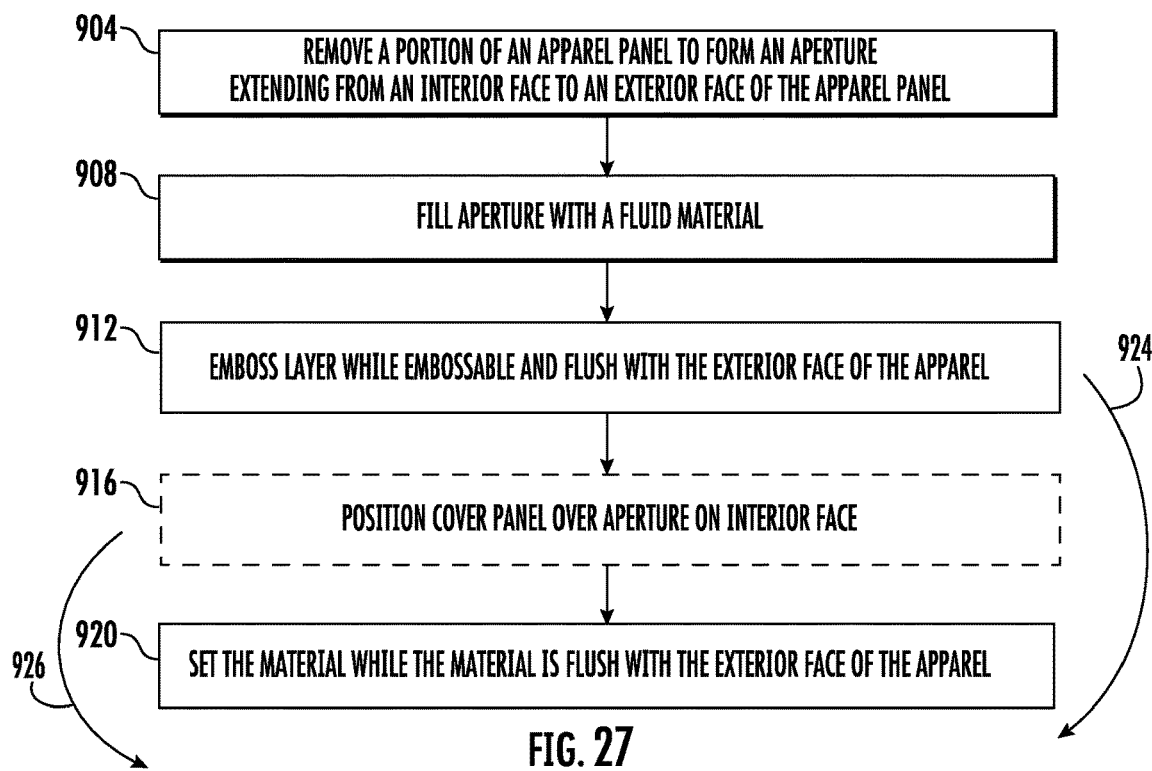
FIG. 27 is a flow diagram of an example apparel patching and embossing method.

FIG. 27 is a flow diagram of an example apparel modification or repair (patching) method 900 which may be utilized to form an embossed any of the apparel shown and described above with respect to FIGS. 1-12. In contrast to method 800 and the examples shown in FIGS. 21-26 which utilize a physical or structural patch, method 900 forms the patch by spraying, injecting or otherwise depositing a fluid or particulate material into the aperture 30. As indicated by block 904, a portion of an apparel panel, such as apparel panel 24, is removed to form an aperture, such as aperture 30, extending from an interior face to an exterior face of the apparel panel. In some implementations, the aperture is completely bounded on all sides by uncut or unsevered portions of the apparel panel. In some implementations, the portion of the apparel panel is removed using a cutting die which is in the form of a cutting blade which concurrently cuts an entire shape or periphery of the aperture being formed. In some implementations, the portion of the apparel panel may be removed using other material removal techniques such as laser cutting, chemical ablation or the like. In some implementations, the portion of the apparel panel that is removed comprises a damaged portion of the apparel such as a portion that is been cut, severed, perforated or burned. In some implementations, the portion apparel than on that is removed is not damaged or otherwise distinguishable from remaining portion of the apparel panel but lies at a location where a patch within insignia, design, logo, name or other label or mark is desired.

As indicated by block 908, the aperture filled with a fluid material. The term "fluid" means that the material may flow. A fluid material may be a liquid or a mass of particulate material (for example, particles, beads or pellets). The fluid material flows into and within the aperture to assume the shape of the aperture. FIG. 28 is a sectional illustrating the repair or modification of an apparel 1020 comprising panel 24 with an aperture 30 formed in block 904. In some implementations, panel 24 may alternatively comprise panel 524 described above.

As further shown by FIG. 28, aperture 30 is filled with fluid material 1022. The fluid material 1022 may be injected, poured, sprayed or otherwise deposited within aperture 30 to fill aperture 30. FIG. 28 illustrates an example where the fluid material 1022 is sprayed from a nozzle 1023 into aperture 30. In some implementations, the fluid material 1022 may be a material that expands following its deposition, such as a foaming material. As shown by FIG. 29, in some implementations, an excess amount of fluid material is deposited within aperture 30 such that fluid material overflows onto exterior face 32 about aperture 30 or the fluid material is deposited onto exterior 31 about aperture 30 at the same time the material is being deposited into aperture 30 (such as by spraying). The deposited fluid material 1022 forms a layer 1040 that resides within aperture 30 and that is flush with exterior surface 32.

As indicated by block 912, the layer 1000 is embossed while the layer is in an embossable state and flush with the exterior face 32 of apparel panel 24. In the example illustrated, embossing panel 822 is positioned across aperture 30 on the exterior face 32 of panel 24. Embossing panel 822 may be supported by an underlying support plate or panel. While embossing panel 82 is positioned across an underside of aperture 30, fluid material 1022 is deposited into aperture 30 to fill aperture 30. As shown by FIG. 28, embossing panel 822 serves as a floor for aperture 230, ensuring that the fluid material 1022 deposited into aperture 30 is flush with the exterior surface 32 of panel 24. In addition, the flow of material 1022 assumes the shape/pattern/texture of the upper face 823 of embossing panel 822.

As indicated by the block 916 shown in broken lines in FIG. 28, an optional substrate or cover may be positioned over the aperture on the interior face of the apparel panel. FIG. 29 illustrates positioning of an optional cover panel 1050 on top of interior face 31, over aperture 30 and over any overflow 1049 of fluid material 1022 on interior face 31 about aperture 30. In some implementations, cover panel 1050 may be omitted.

As indicated by block 920 in FIG. 28, the fluid material is set while the material is flush with the exterior face 32 of the apparel panel 24. FIG. 29 illustrates aperture 30 filled with the fluid material 1022. In the example illustrated, the fluid serial 1022 overflows aperture 30, extending across portions of interior face 31 about aperture 30. In implementations where the fluid material 1022 comprises a liquid, the fluid material 1022, forming a layer 1040 and serving as a "patch" may be set by cooling, curing or cross-linking. In implementations where the fluid material 1022 comprises a non-liquid, such as a mass of a thermoplastic particulate material, the mass of thermoplastic particulate material is first converted to a liquid form such as a heating the material to a temperature above its melting point (prior to or after the application of cover 1050). Thereafter, the thermoplastic material is set by cooling the thermoplastic material or allowing the material to cool to a temperature below its melting temperature.

As shown by FIG. 30, the overflow 1049 may serve to bond, fuse or otherwise join and retain cover 1050 against or along interior face 31 of panel 24. As further shown by FIG. 30, upon setting of the layer 1040 (fluid material 1022), the embossing panel 822 may be withdrawn and separated from exterior face 32, leaving the exterior face 42 of layer 1040 flush with the exterior face 32 of panel 24. In some implementations, the exterior face 42 may be embossed so as to have a texture matching or substantially matching the texture of exterior face 32. In some implementations, the exterior face 42 may have a texture distinct from that of exterior face 32 or may have an embossment comprising a logo, text, pattern, insignia, graphic, name or other design. In some implementations, the set layer 1040 may have a color the same as or different from that of panel 24. In some implementations, the set layer 1040 may be clear or transparent, wherein cover 1050 has an exterior facing surface 1053 having a color matching that of exterior face 32 of panel 24 and wherein cover 1050 has an interior facing surface 1055 having a color matching the color of the interior face 31 of panel 24. In other implementations, such surfaces 1053, 1055 may have other colors or combinations of colors.

As indicated by arrow 924 in FIG. 27, in some implementations, the layer 1040 may be embossed after the setting of the in block 920. For example, in some implementations, the fluid material may be a thermoplastic material. During the filling of aperture 30 with fluid material 1022, the floor of aperture 30 may be provided by a different supporting plate and not embossing panel 822. The fluid material may first be set within aperture 30 in block 920. Thereafter, panel 24 and the deposited set layer 1040 may be flipped. The set material within aperture 30 may be reheated to an embossable state and embossing panel 822 may be pressed or positioned against the exterior face 42 of the layer 1042 embossed the surface of layer 1040 across aperture 30. At this point in time, the material within aperture 30 may be set a second time, such as through cooling of the thermoplastic layer 1040 and the embossing panel 822 may be separated and withdrawn from layer 1040. As discussed above, in some implementations, the embossing panel 822 may be removed prior to complete setting of layer 1040 where the layer 1040 is sufficiently viscous to retain the embossed pattern or texture following the withdrawal of embossing panel 822 and prior to being set.

As indicated by arrow 926, in some implementations, the cover panel 1050 may be applied to interior face 31 across aperture 30 after layer 1040 has been set. For example, in implementations where the layer 1040 comprises a thermoplastic material, the material may be once again reheated to fuse or bond to cover panel 1050. In some implementations, cover panel 1050 may comprise an adhesive thermoplastic material or a thermoset material which may be fused or bonded to interior face 31 of panel 24 across aperture 30. As noted above, in some implementations, cover panel 1050 may be omitted.

Figure 31:
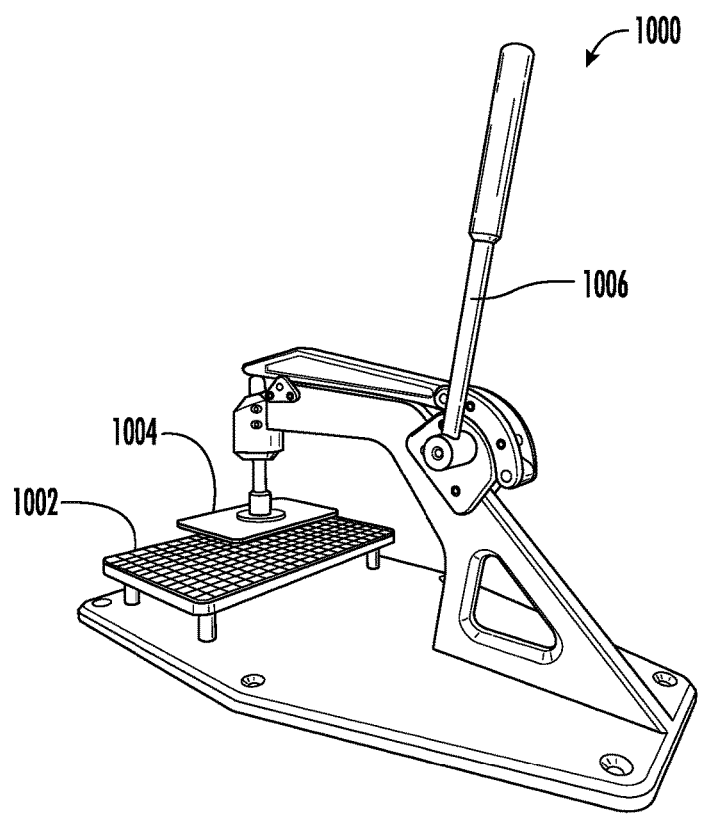
FIG. 31 is a perspective view of an example apparel panel portion removal tool.

FIGS. 31-34 illustrate an example removal tool 1000 and its operation for removing a selected portion of an apparel for replacement with a patch, such as any of the above-described structural patches or fluidically deposited patches. As shown by FIG. 31, tool 1000 comprises a base plate 1002, a press plate 1004 and a compression actuator 1006. Baseplate 1002 serves as support for a panel of fabric from which a portion (damage or undamaged) is to be removed. In some implementations, baseplate 1002 may be cantilevered as shown for facilitating baseplate 1000 to be to be received within an apparel, such as within the sleeve of an apparel.

Press plate 1004 extends opposite to baseplate 1002. Press plate 1004 is movable towards and away from baseplate 1002 by compression actuator 1006. Press plate 1004 carries a cutting die (shown in FIGS. 32 and 33). Cutting die 1008 may be removably mounted to an underside of press plate 1004, facilitating different lease sized and shaped cutting dies to be used with tool 1000. In other implementations, cutting die 1008 may be integrally formed as part of singing unitary body with press plate on thousand and four, wherein press plate 1004 is either fixed or removably attached to tool 1006.

Compression actuator 1006 comprises a mechanism by which press plate 1004 and cutting die 1008 may be raised and lowered with respect to an apparel panel resting upon and supported by baseplate 1002. In the example illustrated, compression actuator 1006 comprises a manually operated lever to raise and lower press plate 1004 and cutting die 1008. In other implementations, compression actuator 1006 may comprise a powered actuator in the form of a hydraulic or pneumatic jack (cylinder-piston assembly). In some implementations, compression actuator 1006 may comprise a screw or other mechanisms for raising and lowering cutting die 1008, either manually or under power.

Figure 32:
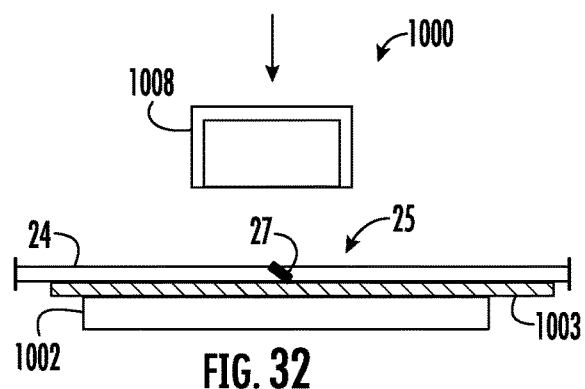
FIG. 32 is a sectional view schematically illustrating portions of the example tool of FIG. 31 with a positioned example apparel panel.

FIG. 32 illustrates an example apparel panel 24 having a portion 25 designated for removal and resting upon baseplate 1002. In the example illustrated, a compressible panel or layer 1003 may be positioned between baseplate 1002 and the apparel panel 24 to facilitate a cleaner or sharper cut by cutting die 1008. In the example illustrated, portion 25 is illustrated as having been damaged, having a burn, stain, cut, tear or puncture 27.

Figure 33:
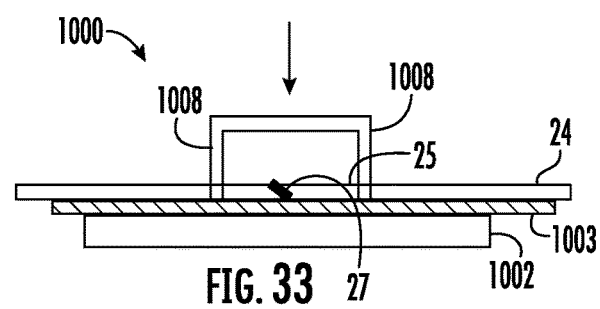
FIG. 33 is a sectional view schematically illustrating portions of the example tool of FIG. 32 with a portion of the example apparel panel being cut.

As shown by FIG. 33, compression actuator 106 is actuated to lower press plate 1004 (not shown in FIG. 33) and cutting die 1008. The particular cutting die 1008 is chosen to have a size and shape so as to encompass portion 25, encompassing/surrounding the burn, stain, cut, tear or puncture 27. The cutting die 1008 cuts through the material of apparel panel 24, permitting the portion 25 to be separated and removed from apparel panel 24. In some implementations, the portion 25 that is removed is completely surrounded by the remaining portions of apparel panel 24. Thereafter, press plate 1004 and cutting tool 1008 may be raised to permit withdrawal of portion 25.

Figure 34:
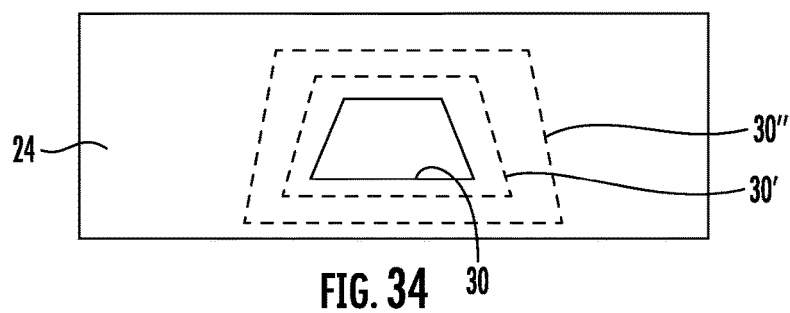
FIG. 34 is a top view illustrating the cut portion of the example apparel panel of FIG. 33 with the portion removed to form an aperture.

FIG. 34 is a top view of apparel panel 24 following the removal of portion 25 to form aperture 30. As shown by broken lines, differently sized and/or shaped cutting dies 1008 may be utilized to form differently sized example apertures 30' or 30".

FIGS. 35-39 are diagrams illustrating portions of an example patching and embossing tool 1100 that may be used to repair or modify an apparel panel, such as apparel panel 24 or 524 described above. Although tool 1100 is illustrated in the context of forming a repaired or modified apparel 320 or 520 as described above, in other implementations, tool 1100 may likewise be utilized to form a repaired or modified apparel 220, 420 or 620 as described above. Tool 1100 comprises base 1101, support post 1102, support plate 1103, wings 1104-1, 1104-2 (collectively referred to as wings 1104), press plate 1106, actuator 1108, heating source 1110, cooling manifold 1112, actuator 1114, and cooling source 1116.

Support post 1102 extends from base 1101 and supports wings 1104. Wings 1104 project outwardly from support post 1102, outwardly from the rotational axis 1120. Wings 1104-1 and 1104-2 support press plate 1106 and cooling manifold 1112, respectively, for positioning over support plate 1103. In the example illustrated, wings 1104 are rotatable, either manually or with a powered rotational actuator (not shown) about axis 1120 to selectively position either press plate 1106 or cooling manifold 1112 over press plate 1103. In some implementations, support post 1102 is rotatable about axis 1120. In some implementations, wings 1104 or rotatable relative to and about support post 1102. In some implementations, wings 1104 may alternatively comprise a disk wheel which is rotatable about axis 1120 and which supports press plate 1106 and cooling interface 1112 for rotation about axis 1120.

Press plate 1106 comprises a plate movably supported by actuator 1108 for movement towards and away from support plate 1103. In the example illustrated, press plate 1106 is heated by heating source 1110. Heating source 1110 may comprise an electrical resistance heating coil or the like to output heat which is thermally conducted to the lower surface of press plate 1106. Actuator 1108 may comprise a hydraulic or pneumatic jack, a screw or screw drive supporting press plate 1106 and selectively rotatable by stepper motor or other motor, or a manual lever for raising and lowering press plate 1106.

Cooling interface 1112 comprises a body configured to bear against an apparel panel being repaired or modified and to guide or direct a cooling medium across the surface of the apparel panel. Cooling interface 1112 may comprise a thermally conductive member plate which may be cooled by internal cooling lines supplied with a cooling fluid from a cooling source 1116. Cooling interface 1112 may comprise an outer cone or other structure for directing a blast of cold air towards an underlying portion of panel 24, 524, the cold air being provided by cooling source 1116. Cooling source 1116 may comprise any cooling device including a refrigerant or other mechanisms by which cold air may be generated and directed through cooling interface 1112. Cooling interface 1112 and cooling source 1116 form an active cooler for carrying out setting of the layer 340. "Active" cooling refers to actively cooling with a medium at a temperature below that of room temperature or ambient temperature. In contrast, "passive" cooling refers to cooling over a period of time with ambient air at room temperature. In some implementations, cooling interface 1116 may comprise a blower for directing a stream of air at room or ambient temperature towards the surface of panel 24, 524 when underlying and borne against by cooling interface 1112.

Actuator 1114 may comprise a hydraulic or pneumatic jack, a screw or screw drive supporting cooling interface 1112 and selectively rotatable by stepper motor or other motor, or a manual lever for raising and lowering cooling interface 1112.

Figure 35:
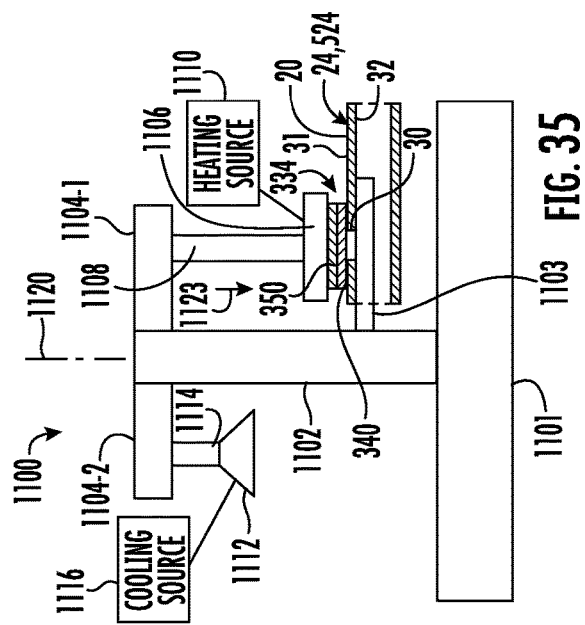

Tool 1100 is configured to carry out the example method 800 described above with respect to FIG. 20. As shown by FIG. 35, the apparel panel 24, 524 with the already formed aperture 30 is positioned so as to rest upon press plate 1104. As shown by broken lines, support plate 1103 may be dimensioned and sized such that support plate 1103 may be received within a portion of the apparel 20, such as within a sleeve of the apparel. As further shown by FIG. 35, patch 334 is positioned over and across the aperture 30 with layer 340 being captured between panel 24, 524 and its backing 350.

Press plate 1106 may be rotated about axis 1120 to a position opposite to support plate 1103. Once patch 334 is positioned on top of panel 24, 524, actuator 1108 lowers press plate 1106 (as indicated by arrow 1123) into engagement with backing 350 so as to press backing 350 and layer 340 towards press plate 1103. Heating source 1110 heats patch 334 to a sufficient elevated temperature such that layer 340 is softened or at least semi fluid, facilitating flow and/or deformation of layer 340 into aperture 30, completely filling aperture 330 such that layer 340 bears against an upper surface of support plate 1103, being flush with exterior face 32 of panel 24, 524. As discussed above with respect to FIGS. 9 and 10, with panel 524, layer 340 may be heated to a sufficient temperature such that it flows and impregnates voids of panel 524.

Figure 36:
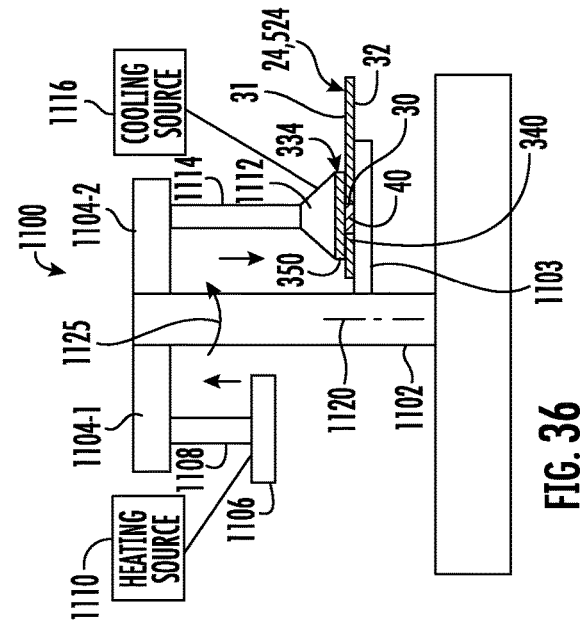
FIGS. 35, 36, 37, 38 and 39 illustrate an example apparel patching and embossing tool during the patching and embossing of an example apparel panel.

FIG. 36 illustrates tool 1100 being used to set layer 340 within aperture 30 while layer 40 is flush with exterior face 32 of panel 24, 524. As shown by FIG. 36, wings 1104 are rotated about axis 1120 in the direction indicated by arrow 1125, to position cooling interface 1112 opposite to support plate 1103. Actuator 1114 may be actuated to lower cooling interface 1112 into engagement with backing 350 of patch 334. A cooling medium provided by cooling source 1116 is directed to cooling interface 1112 to cool the material of layer 340 to a temperature that sets layer 340. The initial step shown in FIGS. 35 and 36 may be referred to as "basting". In some implementations where an embossment is not desired, actuator 1114 may raise cooling interface 1112 out of engagement with panel 24, 524 to complete the process.

Figure 38:
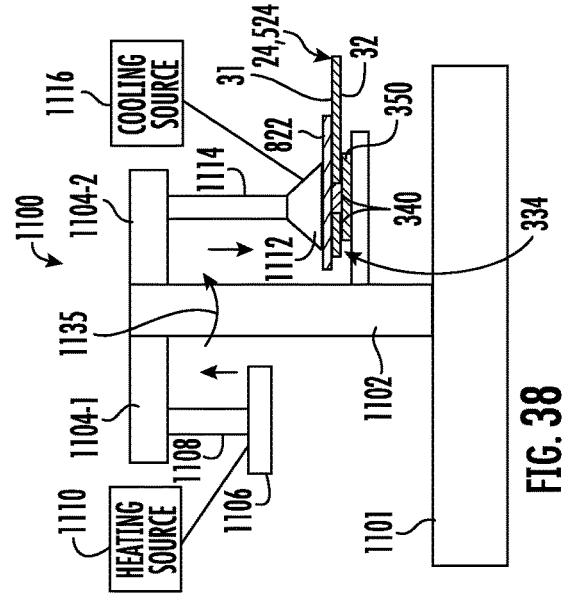
Figure 37:
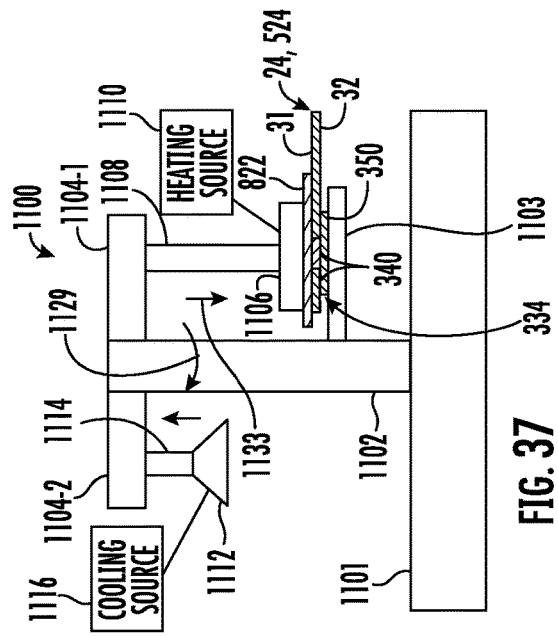

FIGS. 37 and 38 illustrate embossing of the patch 334. As shown by FIG. 37, following raising of the cooling interface 1112, panel 24, 524 with the patch 334 is flipped such that the exterior face 32 faces in an upward direction with backing 350 resting upon support plate 1103. Thereafter, embossing panel 822 (described above) is laid on top of exterior face 32 of panel 24, 524 and over aperture 30. As discussed above, the embossing panel 822 may comprise a fabric having a desired texture, such as a texture corresponding to the texture of exterior 31 of panel 24, 524. Embossing panel 822 may comprise an embossing iron or other structure configured to form depressions and/or protuberances in the surface of layer 340, the depressions and/or protuberances configured to form a name, logo, design, graphic or other embossment in those portions of layer 340 within aperture 30. In some implementations, embossing panel 82 may be removably mounted to an underside of press plate 1106.

As indicated by arrow 1129, wing 1104-1 may be rotated about axis 1120 to position press plate 1106 opposite to support plate 1103. Actuator 1108 is actuated to lower press plate 1106 (as indicated by arrow 1133) into towards support plate 1103, pressing embossing panel 822 against a top of layer 340 within aperture 30. Prior to or during such engagement, heating source 1110 may heat press plate 1106 to a sufficient temperature, above room temperature, so as to sufficiently soften layer 340 to an embossable state. As a result, the depression of embossing panel 822 against layer 340 results in those portions of layer 340 within aperture 30 being embossed. Thereafter, actuator 1108 may raise press plate 1106 away from embossing panel 822.

Figure 39:
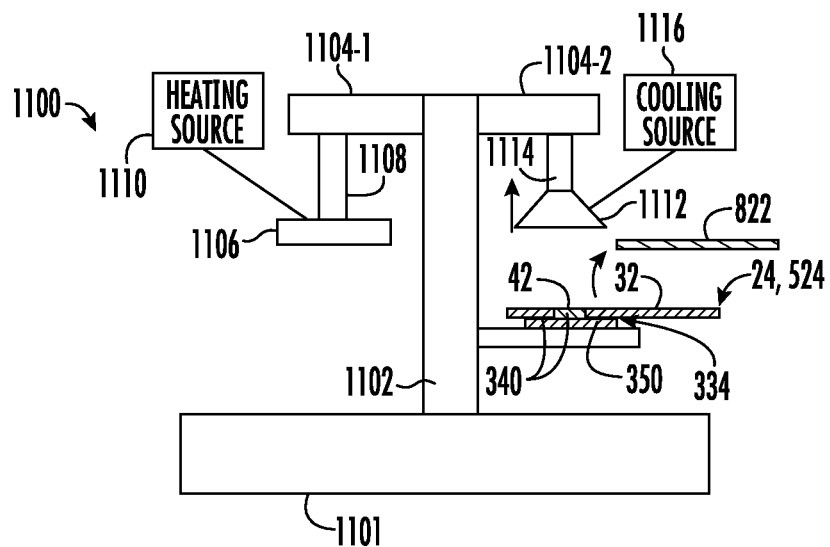

As shown by FIG. 38, wing 1104-2 is rotated in the direction indicated by arrow 1135 to position cooling interface 1112 opposite to support plate 1103. Thereafter, actuator 1114 may lower cooling interface 1112 into cooling engagement with embossing panel 822 (or patch 334). Cooling source 1116 may supply a cooling medium (liquid or) to cooling interface 1112 to cool the material layer 340 to a temperature such that layer 340 is set. As shown by FIG. 39, once layer 340 has been sufficiently set, actuator 1108 may lift cooling interface 1112 out of engagement with panel 24, 524 and embossing panel 822 may be withdrawn, leaving the embossed exterior face 42 of layer 340 flush with the exterior face 32 of panel 24, 524. At such times, the repaired/modified apparel may be withdrawn from tool 1100.

Figure 40:
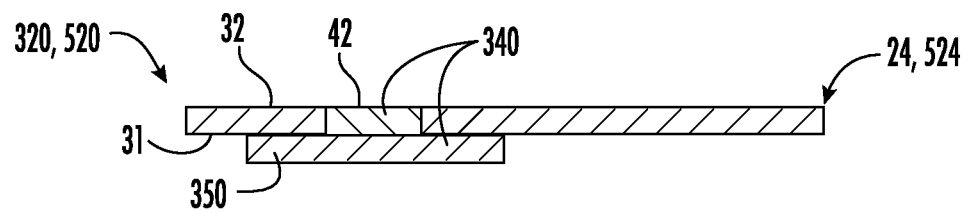
FIG. 40 is a sectional view of an example patched and embossed apparel panel.

FIG. 40 is a sectional illustrating one example of the repaired/modified apparel 320, 520 following the process shown in FIG. 35-38. FIG. 41 is a top view (from the exterior side) of one example of the repaired/modified apparel 320, 520. FIG. 42 is a sectional view of the portion of the panel 24, 524 taken along line 41-41 of FIG. 41. As shown by FIG. 42, exterior face 42 of layer 340 is flush with the exterior face 32 of panel 24, 524. As further shown by FIGS. 40 and 41, exterior face 42 of layer 340 has a texture 1180 matching or substantially matching the texture 1182 of the exterior face 32 of panel 24, 524. As result, the repair of panel 24, 5224 is less visually conspicuous and less noticeable to touch.

FIG. 43 is a top view (from the exterior side) of one example of the repaired/modified apparel 320, 520. FIG. 44 is a sectional view of the portion of the apparel 320, 520 taken along line 41-41 of FIG. 41. As shown by FIG. 42, exterior face 42 of layer 340 is flush with the exterior face 32 of panel 24, 524 but for those portions that have been embossed. As further shown by FIGS. 40 and 41, exterior face 42 of layer 340 has an embossment comprising both text 1186 and a design 1188. Text 1186 is formed by a depression embossed into layer 340. Design 1188 is shown as a protuberance. Although the example text is illustrated as a letter "T" and the graphic is illustrated as a star, it should be appreciated that the text may comprise other letters or multiples of other letters so as to form words, names or the like. Although the example graphic is illustrated as a star, it should be appreciated that the graphic may comprise one or more logos, designs or the like. Although the example text is illustrated as being formed by depression and the example graphic 1188 is illustrated as being formed by a protuberance, the text may be formed by a protuberance and the graphic may be formed by a depression. It should be appreciated that the embossment may comprise only text, only graphics or any number of both.

According to one example implementation, the panel 24, 524 with the formed aperture 30 may be initially pressed and heated by press plate 1106 and heating source 1110 prior to the positioning of patch 334 on top of panel 24, 5 to 4 as shown in FIG. 35. In one implementation, panel 24, 524 is heated at a temperature of 330° F. for approximately 2 to 3 seconds followed by a cold pressed by cooling interface 1112 and cooling source 1116 for approximately 3 to 5 seconds. In some implementations, the cooling medium or cooling air directed at layer 340 is at a temperature of no greater than 70 F. Such a process may prepare panel 24, 524 for subsequent lamination.

According to one example implementation, the heat/press process shown in FIG. 35 is with press plate 1106 at a temperature of 330° C. pressing against patch 334 and panel 24, 524 for a period of 15 seconds, wherein setting process shown in FIG. 36 is carried out for a period of 3 to 5 seconds.

According to one example implementation, the embossing process shown in FIG. 37 is carried out with heat press 1106 heated to a temperature of three or 30° C. and pressed against the embossing panel 822 for a time period of 25 seconds. The setting process shown in FIG. 38 where the temperature of the layer 340 is quickly reduced is carried out for a time period of 3 to 5 seconds. In some implementations, the cooling medium or cooling air directed at layer 340 is at a temperature of no greater than 70 F.

In some implementations, panel 24, 524 comprises an expanded polytetrafluoroethylene, such as commercially available to layer GORE-TEX®. In such implementations, patch 334 comprises a layer 340 of a thermoplastic. adhesive, such as a thermoplastic adhesive commercially available from Bemis Associates. In some implementations, the backing 350 may comprise a layer of expanded polytetrafluoroethylene, such as commercially available to layer GORE-TEX®. In some implementations, the thermoplastic adhesive may be transparent or clear, the exterior face of the backing 350 may have the same color as exterior face 32 of panel 24, 524 and interior face of backing 350 may have the same color as the interior face 31 of panel 24, 524. In some implementations, embossing panel 822 may comprise a silicone fabric having a desired texture. In some implementations, the silicone fabric may comprise Lipeng silicone 80 denier (D) fabric, a fabric that results in the embossment having a texture substantially matches the texture of the expanded polytetrafluoroethylene surface of panel 24, 524. In some implementations, the patch 334 comprises 80 denier Pro 2.0 rugged GORE-TEX® fabric with a 3405 Bemus thermoplastic adhesive laminated on the exterior face of the patch. The particular examples may provide the patch 334 with seamless consistency and water resistance.

Although the claims of the present disclosure are generally directed to patched apparel and patching methods for repairing and such or modifying a portion of an apparel panel, the present disclosure is additionally directed to the features set forth in the following definitions.

Definition 1. An apparel patching method comprising:
removing a portion of an apparel panel to form an aperture extending from an interior face to an exterior face of the apparel panel;
positioning a patch comprising a layer across the aperture on the interior face of the apparel panel;
deforming the layer into the aperture so as to be flush with the exterior face of the apparel panel; and
setting the layer while the layer is flush with the exterior face of the apparel.

Definition 2. The apparel patching method of Definition 1, wherein the patch is positioned such that the layer extends beyond the aperture on the interior face of the apparel panel.

Definition 3. The apparel patching method of Definition 2, wherein the patch comprises a substrate supporting the layer.

Definition 4. The apparel patching method of Definition 1, wherein the apparel panel comprises a fabric comprising a layer.

Definition 5. The apparel patching method of Definition 4, wherein the fabric comprises an expanded polytetrafluoroethylene membrane.

Definition 6. The apparel patching method of Definition 5 further comprising embossing portions of the layer while in an embossable state within the aperture.

Definition 7. The apparel patching method of Definition 6, wherein the exterior face of the apparel panel has a first texture and wherein the layer is embossed with a second texture corresponding to the first texture.

Definition 8. The apparel patching method of Definition 1 further comprising embossing portions of the layer, while in an embossable state, within the aperture.

Definition 9. The apparel patching method of Definition 8, wherein the exterior face of the apparel panel has a first texture and wherein the layer is embossed with a second texture corresponding to the first texture.

Definition 10. The apparel patching method of Definition 8, wherein the layer is embossed with a text or graphic design formed by at least one of protuberances or depressions embossed into the layer.

Definition 11. The apparel patching method of Definition 10, wherein the layer comprises a thermoplastic layer and wherein the thermoplastic layer is above room temperature during deformation into the aperture and during the embossing.

Definition 12. The apparel patching method of Definition 11 further comprising:
actively cooling the thermoplastic layer following the pressing of the thermoplastic layer into the aperture and prior to the embossing of the portions of the thermoplastic layer; and
heating the thermoplastic layer following the cooling and prior to the embossing of the portions of the thermoplastic layer.

Definition 13. The apparel patching method of Definition 1, wherein the layer is a thermoplastic layer that is at an elevated temperature during the pressing of the thermoplastic layer such that portions of the thermoplastic layer are at least softened and such that the portions of the thermoplastic layer deform and flow into the aperture.

Definition 14. The apparel patching method of Definition 1, wherein the removing of the portion of the apparel comprises pressing a cutting die enclosing the against the apparel panel.

Definition 15. The apparel patching method of Definition 1 further comprising:
providing a repair tool having a support plate, heated press plate and a cooler, wherein the heated press plate and the cooler are rotatable to positions opposite the support plate;
positioning the damaged portion of the apparel panel with the aperture on the support plate opposite the heated press plate;
positioning the patch across the aperture;

lowering and pressing the heated press plate against the patch;

raising the heated press plate away from the patch;

rotating the cooler to a position opposite the patch and lowering the cooler to cool the patch;

positioning an embossing panel across the patch;

rotating the heated press plate to a position opposite the embossing panel and the patch;

lowering and pressing the heated press plate against the embossing panel and the patch;

raising the heated press plate and rotating the cooler to a position opposite the embossing panel and the patch;

lowering the cooler to cool the embossing panel and the patch; and raising the cooler and separating the embossing panel from the patch.

Definition 16. The apparel patching method of Definition 1 further comprising:

providing a repair tool having a support plate and heated press plate;

positioning the damaged portion of the apparel panel with the aperture on the support plate opposite the heated press plate;

positioning the patch across and on top of the aperture;

lowering and pressing the heated press plate against the patch and applying first amount of heat to baste the patch to the apparel panel;

raising the heated press plate following basting of the patch to the apparel panel;

flipping the apparel panel with the basted patch over on the support plate;

lowering the heated press plate against the basted patch;

lowering and pressing the heated press plate against the embossing panel and the patch and applying a second amount of heat, greater than the first amount of heat, to laminate the patch to the apparel panel;

raising the heated press plate and positioning and embossing panel over the patch;

lowering the heated press plate and the applying heat to the embossing panel and the underlying patch; and raising the heated press plate and separating the embossing panel from the patch.

Definition 17. The apparel patching method of Definition 16 further comprising actively cooling the patch following the lamination of the patch to the apparel panel and prior to the applying of heat to the embossing panel and the underlying patch.

Definition 18. The apparel patching method of Definition 1, wherein the apparel panel comprises an expanded polytetrafluoroethylene membrane and wherein the layer comprises a thermoplastic adhesive.

Definition 19. The apparel patching method of Definition 1, wherein the setting of the layer comprises cooling the layer.

Definition 20. The apparel patching method of Definition 1, wherein the setting of the layer comprises curing the layer.

Definition 21. An apparel comprising:

a panel comprising an apparel panel having an aperture extending through the panel from an interior face to an exterior face of the apparel panel;

a patch extending opposite the apparel panel and across the aperture on the interior face of the apparel panel, the patch comprising a layer joined to portions of the apparel panel about the aperture and filling the aperture so as to be flush with the exterior face of the apparel panel.

Definition 22. The apparel of Definition 21, wherein portions of the patch flush with the exterior face of the apparel panel are embossed.

Definition 23. The apparel of Definition 22, wherein the exterior face of the apparel panel has a first texture and wherein the portions of the patch flush with the exterior face of the apparel panel have a second texture corresponding to the first texture.

Definition 24. The apparel of Definition 22, wherein the exterior face of the apparel panel is embossed with text and/or a graphic design formed by at least one of protuberances and depressions embossed into the layer.

Definition 25. The apparel of Definition 21, wherein the apparel panel comprises a mesh of fibers about the aperture and wherein the layer is a thermoplastic layer impregnated into the mesh of fibers.

Definition 26. The apparel of Definition 21, wherein the apparel panel comprises an expanded polytetrafluoroethylene membrane and wherein the thermoplastic layer comprises a thermoplastic adhesive.

Definition 27. The apparel of Definition 21, wherein the patch is positioned such that the layer extends beyond the aperture on the interior face of the apparel panel.

Definition 28. The apparel of Definition 21, wherein the patch comprises a substrate supporting the layer.

Definition 29. The apparel of Definition 21, wherein the apparel panel comprises a fabric comprising a thermoplastic layer.

Definition 30. The apparel of Definition 29, wherein the fabric comprises an expanded polytetrafluoroethylene membrane.

Definition 31. The apparel of Definition 1, wherein the layer is an expanded foam layer.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An apparel patching method comprising:

removing a portion of an apparel panel to form an aperture extending from an interior face to an exterior face of the apparel panel;

positioning a patch comprising a layer across the aperture on the interior face of the apparel panel;

deforming the layer into the aperture so as to be flush with the exterior face of the apparel panel; and setting the layer while the layer is flush with the exterior face of the apparel panel.

2. The apparel patching method of claim 1, wherein the patch is positioned such that the layer extends beyond the aperture on the interior face of the apparel panel.

3. The apparel patching method of claim 2, wherein the patch comprises a backing on the layer.

4. The apparel patching method of claim 3, wherein the patch comprises a fabric comprising an expanded polytetrafluoroethylene membrane.

5. The apparel patching method of claim 4 further comprising embossing portions of the layer while in an embossable state within the aperture.

6. The apparel patching method of claim 5, wherein the exterior face of the apparel panel has a first texture and wherein the layer is embossed with a second texture corresponding to the first texture.

7. The apparel patching method of claim 1 further comprising embossing portions of the layer, while in an embossable state, within the aperture.

8. The apparel patching method of claim 7, wherein the exterior face of the apparel panel has a first texture and wherein the layer is embossed with a second texture corresponding to the first texture.

9. The apparel patching method of claim 8, wherein the layer is embossed with a text or graphic design formed by at least one of protuberances or depressions embossed into the layer.

10. The apparel patching method of claim 9, wherein the layer comprises a thermoplastic layer and wherein the thermoplastic layer is above room temperature during deformation into the aperture and during the embossing.

11. The apparel patching method of claim 10 further comprising:
actively cooling the thermoplastic layer following the deforming of the thermoplastic layer into the aperture and prior to the embossing of the portions of the thermoplastic layer; and
heating the thermoplastic layer following the cooling and prior to the embossing of portions of the thermoplastic layer.

12. The apparel patching method of claim 1, wherein the layer is a thermoplastic layer that is at an elevated temperature during the deforming of the thermoplastic layer such that portions of the thermoplastic layer are at least softened and such that the portions of the thermoplastic layer deform and flow into the aperture.

13. The apparel patching method of claim 1, wherein the apparel panel comprises an expanded polytetrafluoroethylene membrane and wherein the layer comprises a thermoplastic adhesive.

14. The apparel patching method of claim 1, wherein the setting of the layer comprises cooling the layer.

* * * * *